US010684966B1

(12) United States Patent
Hamman et al.

(10) Patent No.: US 10,684,966 B1
(45) Date of Patent: Jun. 16, 2020

(54) ORCHESTRATING DATAFLOWS WITH INFERRED DATA STORE INTERACTIONS

(71) Applicant: Amazon Technologies, Inc., Seattle, WA (US)

(72) Inventors: Richard Hamman, Cape Town (ZA); Izak Van Der Merwe, Cape Town (ZA); Pavel Tcholakov, Cape Town (ZA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/282,182

(22) Filed: Feb. 21, 2019

(51) Int. Cl.
   *G06F 13/16* (2006.01)
   *G06F 16/901* (2019.01)

(52) U.S. Cl.
   CPC ...... *G06F 13/1668* (2013.01); *G06F 16/9024* (2019.01)

(58) Field of Classification Search
   CPC combination set(s) only.
   See application file for complete search history.

(56) References Cited

U.S. PATENT DOCUMENTS

| | | | |
|---|---|---|---|
| 6,826,568 B2 | 11/2004 | Bernstein et al. | |
| 6,976,257 B2 | 12/2005 | Leymann et al. | |
| 7,577,554 B2 | 8/2009 | Lystad et al. | |
| 7,636,801 B1 | 12/2009 | Kekre et al. | |
| 8,099,480 B1 | 1/2012 | Muthusrinivasan et al. | |
| 8,145,595 B2 | 3/2012 | Kloppmann et al. | |
| 8,195,693 B2 | 6/2012 | Syeda-Mahmood | |
| 9,003,425 B2 | 4/2015 | Saha et al. | |
| 9,262,228 B2 | 2/2016 | Bond et al. | |
| 9,367,434 B2 | 6/2016 | Taneja et al. | |
| 9,619,788 B2 | 4/2017 | Helbok et al. | |
| 9,690,546 B2 | 6/2017 | Ben Jemaa et al. | |
| 9,910,697 B2 | 3/2018 | DeArment | |
| 2004/0230636 A1 | 11/2004 | Masuoka et al. | |
| 2006/0136428 A1 | 6/2006 | Syeda-Mahmood | |
| 2008/0065455 A1 | 3/2008 | Sun et al. | |
| 2009/0172689 A1 | 7/2009 | Bobak et al. | |
| 2014/0032617 A1 | 1/2014 | Stanfill | |
| 2015/0261580 A1 | 9/2015 | Shau et al. | |
| 2015/0264119 A1 | 9/2015 | Shau et al. | |

(Continued)

OTHER PUBLICATIONS

Jeff Barr, "Amazon EC2 Container Service (ECS)—Container Management for the AWS Cloud," Amazon.com, Nov. 2014. Retrieved from: https://aws.amazon.com/blogs/aws/cloud-container-management/, pp. 1-6.

(Continued)

*Primary Examiner* — Henry Tsai
*Assistant Examiner* — Juanito Borromeo
(74) *Attorney, Agent, or Firm* — Robert C. Kowert; Kowert, Hood, Munyon, Rankin & Goetzel, P.C.

(57) ABSTRACT

An orchestration request indicating input data types and output data types of a collection of functions is received at a network-accessible service. At the service, one or more I/O operations that are to be performed at a data store to execute a dataflow corresponding to the request are inferred based on analysis of the input data types and output data types. A template representing the dataflow is stored, comprising respective nodes representing the functions and the I/O operations, as well as an indication of the sequencing of execution of the functions and I/O operations.

20 Claims, 15 Drawing Sheets

(56) References Cited

U.S. PATENT DOCUMENTS

| | | |
|---|---|---|
| 2015/0264122 A1 | 9/2015 | Shau et al. |
| 2015/0278395 A1 | 10/2015 | Ben Jemaa et al. |
| 2017/0285981 A1 | 10/2017 | DeArment |
| 2017/0323089 A1 | 11/2017 | Duggal et al. |

OTHER PUBLICATIONS

Jeff Barr, "AWS Lambda—Run Code in the Cloud," Amazon.com, Nov. 2014. Retrieved from: https://aws.amazon.com/blogs/aws/run-code-cloud/, pp. 1-9.

Jeff Barr, "Amazon API Gateway—Build and Run Scalable Application Backends," Amazon.com, Jul. 2015. Retrieved from: https://aws.amazon.com/blogs/aws/amazon-api-gateway-build-and-run-scalable-application-backends/, pp. 1-14.

Jeff Barr, "API Gateway Update—New Features Simplify API Development," Amazon.com, Sep. 2016. Retrieved from: https://aws.amazon.com/blogs/aws/api-gateway-update-new-features-simplify-api-development/, pp. 1-11.

U.S. Appl. No. 15/629,559, filed Jun. 21, 2017, Robin Alan Golden, et al.

U.S. Appl. No. 15/629,561, filed Jun. 21, 2017, Robin Alan Golden, et al.

U.S. Appl. No. 15/629,594, filed Jun. 21, 2017, Robin Alan Golden, et al.

At a dataflow orchestration service (e.g., at a provider network) receive an orchestration request comprising an unordered set of stateless function descriptors, with input data types and output data types defined for individual functions, as well as optional annotations   1101

↓

Infer, based on analysis of the stateless function descriptors, that one or more input/output operations directed to at least one data store are to be performed to execute a data flow corresponding to the orchestration request; some I/O operations and/or functions may have to be performed as part of atomic transactions whose boundaries may be indicated in the request, or inferred   1104

↓

Perform verification operations, e.g., to confirm that a directed acyclic graph (DAG) indicating sequencing of functions and I/O operations can be derived from the orchestration request, that partition keys for persistent storage objects can be identified, etc.; if required, request clarifications from the request source   1107

↓

Generate and store a template corresponding to the orchestration request, comprising a DAG whose nodes correspond to respective functions and I/O operations; if needed, based on inferred I/O operations, initialize one or more objects (e.g., tables) at one or more data store instances; the particular data store types, data store instances and/or materialization nodes for the persistent data may be selected by the orchestration service   1110

↓

Provide an indication, to the request source, of a network endpoint that can be used to submit requests for executions of instances of the dataflow and/or one or more interfaces that can be used to view the template and associated persistence metadata   1113

*FIG. 11*

ORCHESTRATING DATAFLOWS WITH INFERRED DATA STORE INTERACTIONS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace.

Some data center operators provide network access, power, and secure installation facilities for hardware owned by various customers, while other data center operators provide "full service" facilities that also include hardware resources made available for use by their customers. Such resources at data centers, when accessed by remote customers, may be said to reside "in the cloud" and may be referred to as cloud computing resources or provider network resources.

Several different kinds of back-end services may be made accessible to large numbers of clients of provider network or cloud environments, including various types of virtualized computing services, storage or database services, services optimized for application domains such as artificial intelligence and the like. In many cases, the kinds of tasks that clients wish to have performed at provider networks may potentially involve the use of several different kinds of resources and/or services to implement respective sub-tasks. The services themselves may require the use of respective distinct programmatic interfaces, and the times taken to complete individual sub-tasks may vary widely. As a result, coordinating the different sub-tasks of a multi-resource or multi-service application may present a non-trivial challenge. Testing and debugging such applications may also be difficult, especially when individual sub-tasks may have side effects that are hard to detect.

BRIEF DESCRIPTION OF DRAWINGS

FIG. 11 is a flow diagram illustrating aspects of operations that may be performed to generate and store dataflow templates, according to at least some embodiments.

Figure 1:
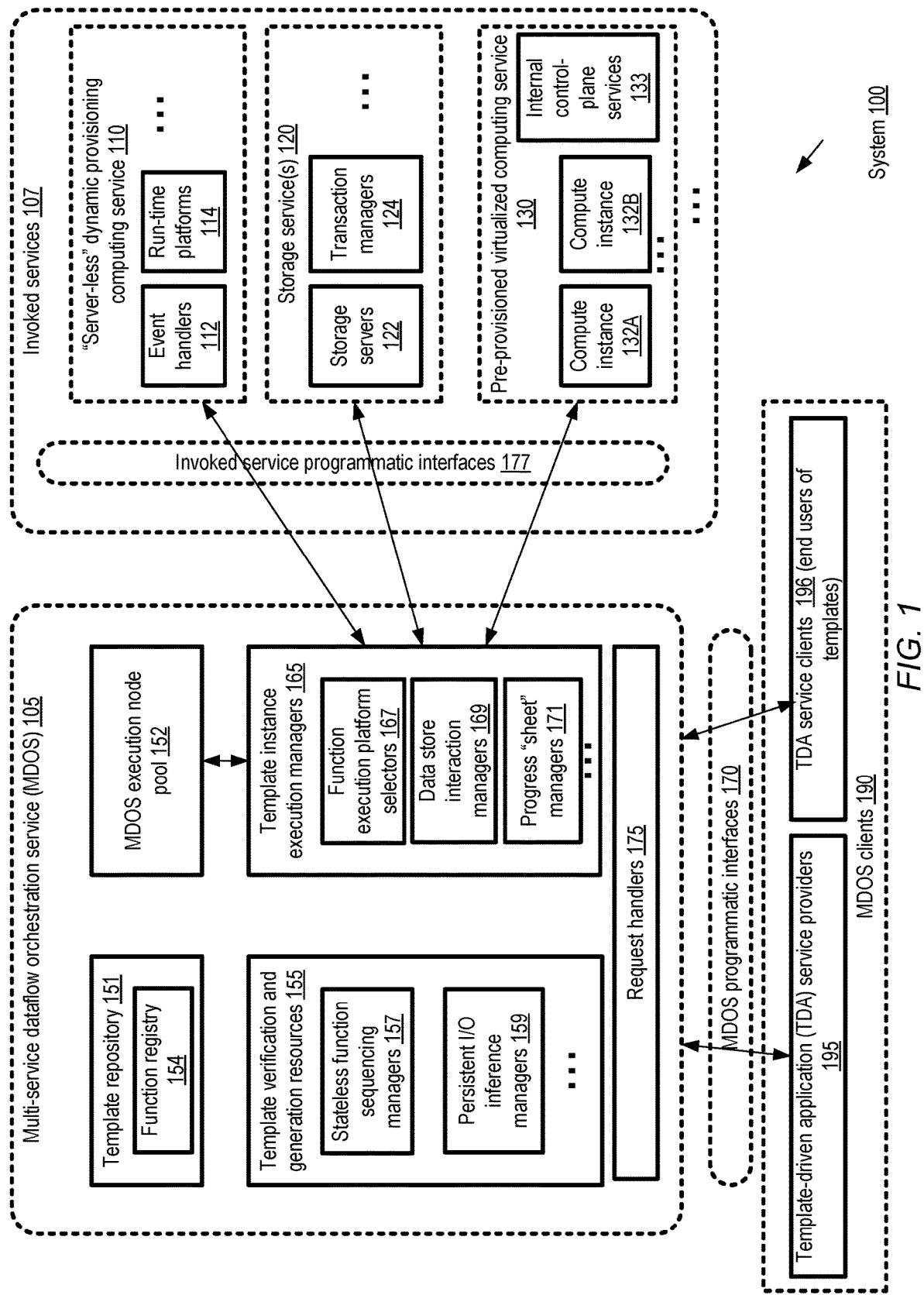
FIG. 1 illustrates an example system environment in which an orchestration service may infer persistent I/O operations to be performed as part of a dataflow corresponding to a collection of stateless functions, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure generally relates to systems and techniques for implementing an orchestration service which automatically infers and coordinates data store interactions associated with potentially complex multi-service application dataflows, and thereby reduces the effort required from application designers, developers and end users. In at least some embodiments, such an orchestration service may be utilized by at least two categories of clients: designers/developers of complex applications, and end-users of such applications. At a high level, in various embodiments the orchestration service may (a) enable a client (such as an application developer) to programmatically submit an orchestration request comprising a description of sub-tasks of an application or task (expressed for example using an unordered collection of stateless or "pure" functions), (b) generate and store a template representing a dataflow corresponding to the application or task, comprising for example a directed acyclic graph, with one or more nodes representing respective functions and one or more nodes representing inferred data store I/O operations that may be performed as part of atomic transactions, and later (c) execute, on behalf of end users of the application, respective instances of the dataflow, without necessarily requiring the end users to specify the resources to be used to execute the instances.

The disclosed orchestration service can eliminate many of the requirements for information to be determined and/or provided by an application developer or end user regarding the application dataflow or its execution, such as the particular computing resources to be used for various sub-tasks, the type of data store to be used, the schema to be used for persistent data of the dataflow, connection coordinates for accessing data stores, and the like. As such, the responsibilities for making many of the implementation choices may be taken over by the orchestration service in various embodiments, allowing the application designers/developers to focus on the business logic of their applications using clear and easy-to-understand stateless functions, and also allowing end users of the applications to focus simply on providing the dataflow inputs and obtaining the dataflow results.

The terms "stateless function" or "pure function" as used herein refer to a function whose output or result values are determined solely based on the inputs provided to the function, such that a particular execution of the function does not result in any side effects (such as updates to some data structure that is not part of the inputs or outputs). In some embodiments, a programming model similar to that supported by functional programming environments and languages may be used by clients of the orchestration service in submitted orchestration requests that describe their applications. A given application may comprise one or more dataflows in some embodiments, necessitating the submission of several different orchestration requests to an MDOS. In at least one embodiment, one or more functional programming languages, such as Haskell, Scala, Erlang, Lisp, ML, Clojure, OCaml, Common Lisp, Racket or the like may be used to formulate orchestration requests (e.g., to specify the bodies or code of the functions). Other types of programming languages and/or interface specifications may be used to describe the functions in various embodiments. In some embodiments, while the orchestration service may assume that the functions being used to describe an application or dataflow in an orchestration request are stateless, the service may not necessarily verify that the functions are in fact stateless. In other embodiments, the service may verify that one or more of the functions do not have side effects, e.g., either as part of a suite of verification operations whose success is a prerequisite for generating a template, or in response to requests or hints from a client indicating that function purity/statelessness is to be confirmed or checked.

According to some embodiments, a system may comprise one or more computing devices of a network-accessible orchestration service, implemented for example at a provider network or cloud computing environment. The computing devices may include instructions that upon execution or across one or more processors cause the computing devices to obtain an indication of an orchestration request comprising a plurality of stateless function descriptors. A given stateless function descriptor may include (a) a set of one or more input data types of a stateless function and (b) a set of one or more output data types of the stateless function in various embodiments. The orchestration request may not indicate a sequence in which respective stateless functions corresponding to the descriptors are to be invoked in at least some embodiments. In various embodiments, the orchestration request may not include an indication of any data stores to be used for the dataflow. The computing devices of the orchestration service may infer, based at least in part on an analysis of the input and output data types of one or more of the stateless functions indicated in the request, that one or more input/output (I/O) operations directed to at least one data store are to be performed as part of a transaction to execute a dataflow corresponding to the orchestration request in various embodiments. As such, even though the orchestration request need not include any specific information about data stores or I/O operations, such operations may be deduced by the orchestration service in such embodiments based on analyzing the function descriptors.

In various embodiments, the orchestration service may generate a dataflow template comprising a directed acyclic graph (DAG) corresponding to the orchestration request. The DAG may include a plurality of nodes representing respective ones of the stateless functions, one or more nodes representing respective deduced/inferred I/O operations, and edges indicating sequencing of the execution of the functions and I/O operations in various embodiments. The sequencing of the execution may also be deduced based on an analysis of the input and output data types indicated in the orchestration request in such embodiments—e.g., in a trivially simple scenario, if one function F1 has an output data type DT1, and among the other functions, only F2's input data type is DT1, the execution order "F1 before F2" may be inferred. In at least some embodiments, the DAG may indicate boundaries of one or more transactions that include inferred I/O operations and/or functions, or metadata indicating the transaction boundaries may be generated separately from the DAG. The template comprising the DAG and/or associated metadata may be stored in a repository of the orchestration service in various embodiments.

If/when an execution request for an instance of the dataflow represented by the template is received, in various embodiments the orchestration service may employ a combination of resources to implement the operations represented by nodes of the dataflow, in an order indicated by the DAG. In some embodiments, to perform computations corresponding to a given node of the DAG of the template, a "server-less" dynamic provisioning computing service of a provider network may be employed, another type of computing service may be used, or a fleet of resources of the orchestration service itself may be utilized. Details about the service(s) or resource(s) to be employed for the execution instance may not have to be provided to the orchestration service in various embodiments, e.g., either by the developer/designer at whose request the template was generated or by the end-user. As suggested by its name, a server-less computing service may not require any specific resources to be provisioned or allocated in advance by a requester of a computation or function in various embodiments; instead, a description of the computation and/or code implementing the computation may be provided by the requester, and the service may dynamically select/provision a compute resource to run the computation. The results of the computation may be provided to the requester when they become available, and the requester may not necessarily be provided any information about the specific resources that were used to obtain the results. State information, e.g., pertaining to one or more transactions that are part of the dataflow, may be read from and/or written to one or more data stores by the orchestration service as part of the execution of the instance in various embodiments. Note that while individual functions of the dataflow may be stateless, persistent records of state changes resulting from various inferred I/O operations may nevertheless have to be stored in various embodiments; that is, the dataflow as a whole may be stateful, even though individual constituent functions that make up the dataflow may not store state information themselves. Completion status and/or results of the execution of the dataflow instance may be provided by the service, e.g., to the requester of the execution in at least some embodiments.

In some embodiments, the orchestration service may create persistent storage objects (e.g., database tables) based on inferences regarding I/O operations that have to be performed. In at least one embodiment, annotations of various types may be included in the orchestration requests—e.g., one or more function inputs and/or outputs may be annotated as "persistent," and/or annotated as potential sharding/partitioning keys for storage objects. In at least one embodiment, transaction boundaries (e.g., the equivalent of "transaction start" and "transaction end" labels) may be indicated in the orchestration request; in other embodiments, such boundaries may be inferred by the service. In some embodiments, the orchestration service may submit proposed transactions to a transaction manager affiliated with one or more data stores to execute a dataflow, e.g., comprising one or more proposed writes of a write set determined based on contents of a read set obtained from the one or more data stores, with the reads and writes representing examples of the inferred I/O operations. If such a proposed transaction is accepted/committed, the writes of the write set may be applied atomically in various embodiments at the data stores.

In at least one embodiment, in response to an orchestration request, in addition to generating and storing a template comprising a DAG, a network endpoint which can be used to submit requests for executing the dataflow may set up by the orchestration service, and provided to the submitter of the orchestration request. Information about such endpoints may be propagated to end users by any of a variety of mechanisms in different embodiments—e.g., via one or more web sites. In some embodiments, the orchestration service may detect one or more ambiguities, errors, or missing information in an orchestration request (e.g., the request may not contain sufficient information to fully determine an execution sequence of the functions), and may interact with the submitter of the orchestration request to resolve such problems before generating/storing a verified version of a template.

Any of several different types of data stores, including for example key-value data stores, relational database systems, journal-based transaction management systems and the like may be used, singly or in combination, for one or more dataflows in different embodiments. In some embodiments, a partitioning or sharding attribute/key may be defined for a data object generated by the orchestration service to store persistent data associated with a dataflow, and the data may be automatically re-partitioned or redistributed among storage devices as needed using the key, e.g., based on detected increases in the workload directed to different partitions. Such automated re-distribution of the persistent data may be performed without any re-distribution requests from the clients on whose behalf the data is being stored in at least some embodiments; in some cases, the clients may not even be made aware of the specific data stores being used.

In at least some embodiments, a data structure representing the progress of executing a given instance of a dataflow may be generated at the orchestration service, and visibility to the data structure may be provided to one or more clients of the service (e.g., the client on whose behalf the instance is being executed, and/or a designer/developer/administrator of the application whose instance is being executed). Such a data structure may be referred to as a "sheet" in at least some embodiments. In one embodiment, respective graphical views of the inputs, outputs, completion status, time taken for completion and the like with respect to various functions and/or inferred I/O operations may be provided to clients of the orchestration service. In some embodiments, graphical representations of the DAG and associated persistent data schemas may also or instead be provided to clients. In some embodiments, interfaces that can be used to automate testing of the application dataflow, e.g., by automatically generating a range of dataflow inputs, may also be provided.

As one skilled in the art will appreciate in light of this disclosure, certain embodiments may be capable of achieving various advantages, including some or all of the following: (a) enhancing the robustness and reliability of complex applications and services, e.g., by ensuring that the business logic of the applications is expressed using stateless functions that do not cause side effects, and by inferring and automating application interactions with persistent data stores, (b) reducing the amount of computing resources required to thoroughly test and debug complex applications, especially in cases where the results of a task are potentially dependent on subtle timing issues, race conditions and the like; (c) improving performance (e.g., throughput and/or response times) of the applications, e.g., by automatically re-sharding the data objects used to store application information, without requiring input from the application developers or users, and (d) enhancing the user experience of end-users as well as application developers/testers, e.g., by providing easy-to-understand visual representations and traces of dataflow execution, inferred operations and schemas, and so on.

Example System Environment

FIG. 1 illustrates an example system environment in which an orchestration service may infer persistent I/O operations to be performed as part of a dataflow corresponding to a collection of stateless functions, according to at least some embodiments. As shown, system 100 may comprise resources and artifacts of a multi-service dataflow orchestration service (MDOS) 105 in the depicted embodiment, including for example template verification and generation resources 155, template instance execution managers 165, request handlers 175, a template repository 151 and a pool of execution nodes 152. Individual ones of these components 151, 152, 155, 165 and/or 175 of the MDOS may be implemented using a combination of hardware and/or software at one or more computing devices in various embodiments; in some embodiments, several of the components may be implemented at a single computing device. In addition, system 100 may also include one or more services 107 that may be invoked to perform various functions or operations associated with dataflows managed at the MDOS, including for example a server-less dynamic provisioning computing service 110, one or more data storage services 120, a pre-provisioned virtualized computing service 130 and the like.

In the depicted embodiment, the MDOS may help orchestrate or coordinate the use of various types of resources, including one or more invoked services 107, to perform complex tasks or applications on behalf of MDOS clients 190. The MDOS may receive an indication of a task or application, specified as a collection of unordered stateless or side-effect-free functions, make inferences regarding the sequencing of the functions and I/O operations to be performed as part of a dataflow of the task or application, and generate a template comprising a graph of nodes representing the functions and/or inferred I/O operations in various embodiments. Later, when requested, the MDOS may coordinate the execution of respective instances of the dataflow represented by a template for various clients; at least in some cases, executing an instance of a dataflow may involve submitting requests to one or more other services 107 via their programmatic interfaces 177, obtaining respective responses to such requests (which may be asynchronous with respect to one another), organizing the responses received from multiple sources to form the appropriately arranged input to other functions, and so on. The applications or tasks whose dataflows are orchestrated may be referred to as template-driven applications (TDAs) in various embodiments. Note that a given template-driven application may involve the use of several different dataflow templates in some embodiments; as such, all the business logic of a given application may not necessarily be captured within a single dataflow.

In the depicted embodiment, the MDOS 105 may implement a set of programmatic interfaces 170, which may be utilized by at least two categories of MDOS clients 190 to submit requests and receive corresponding responses. The programmatic interfaces 170 may include, for example, one or more web-based consoles, a set of application programming interfaces (APIs), graphical user interfaces, command-line tools or the like. A first category of clients, template-drive application (TDA) service providers (e.g., developers/designers of TDAs and/or network-accessible services built on top of TDAs), may submit dataflow orchestration requests via the MDOS programmatic interfaces in some embodiments. A given orchestration request may comprise an unordered collection or "bag" of function descriptors, individual ones of which may indicate a set of input data types and output data types of a stateless function. In at least some embodiments, the "body" or logic of a function may also be included, together with its input and output signature, in an orchestration request. In other embodiments, function bodies for at least some functions may not be required—instead, a previously-registered function descriptor that contains the body may be referenced in the orchestration request. In an orchestration request, the TDA service providers 195 may not have to include any information about data stores at which persistent state information pertaining to the dataflow may potentially be stored in at least some embodiments; instead, in such embodiments, the MDOS 105 may infer one or more persistent I/O operations (e.g., reads from and/or writes to one or more data storage services 120) that are to be performed as part of the dataflow. In addition, in at least some embodiments, no information or details may have to be included in the orchestration request regarding the specific computing resources or services to be invoked to perform the computations of the functions. Requests from MDOS clients may be processed initially at request handlers 175, and then passed on to the appropriate internal components of the MDOS 105 in various embodiments, e.g., based on the type of request. Orchestration requests may, for example, be passed on to the template verification and generation resources 155, while requests to execute dataflows may be transmitted to the template instance execution managers 165.

At least two types of inferences may be performed at the template verification and generation resources 155 of the MDOS 105 in the depicted embodiment. Based at least in part on an analysis of the input and output data types of the functions represented by the function descriptors, stateless function sequencing managers 157 may deduce the order in which the functions are to be invoked. In addition, also based at least in part on the analysis of the input and output data types, and/or based on annotations included in the orchestration request, one or more I/O operations to/from persistent data stores or storage services may be inferred, e.g., at persistent I/O inference managers 159. In some cases, one or more I/O operations and/or one or more functions may be combined into a transaction; that is, transaction start and end boundaries may also be determined/deduced if needed for a dataflow corresponding to the orchestration request. If an orchestration request does not satisfy one or more criteria, e.g., if it is not possible to infer function sequencing unambiguously, or if a partitioning/sharding key cannot be identified for a persistent data object to be created for the dataflow, in some embodiments one or more messages requesting clarifications/corrections of the orchestration request may be sent back to the orchestration request source, and the request source may submit a modified version of the orchestration request.

After the analysis of the function descriptors is completed and any required verification checks succeed, a template representing a dataflow definition corresponding to the orchestration request may be generated and stored, e.g., in template repository 151 of the MDOS 105 in the depicted embodiment. Such templates may also be referred to as "recipes" in some embodiments. A given template may comprise a graph (e.g., a directed acyclic graph or DAG) with a set of nodes and directed edges in at least some embodiments. Individual ones of the nodes may represent respective ones of the stateless functions and/or respective I/O operations in various embodiments, and the directions of the edges may indicate the sequencing among the operations represented by the nodes. In at least one embodiment, the template may also indicate transaction boundaries—e.g., a set of functions and/or I/O operations that are to be completed atomically (or, if successful completion is not possible, fail as a group) may be indicated by the equivalent of a "start transaction" and "end transaction" token/node. In at least some embodiments, the MDOS 105 may also provide, corresponding to a template that has been created and stored, a network endpoint (e.g., a URI or Universal Resource Identifier) that can be used to submit requests for executing instances of the dataflow represented by the template. In at least one embodiment, template repository 151 may comprise a function registry 154, in which at least a subset of the descriptors of stateless functions indicated in various orchestration requests for which verified templates have been created are stored. Such a function registry may, for example, be used as a library of re-usable functions, which can be referenced in an orchestration request. In one embodiment, the template verification and generation resources 155 may include a code generator, which may produce source code and/or executable code representing the inferred I/O operations.

After a template of a dataflow has been generated and/or stored in the repository 151, in at least some embodiments TDA service clients 196 (end users of the templates) may be permitted to submit requests to execute instances of the dataflows. Note that a TDA service provider 195 may of course also submit such requests if desired; the same client may submit orchestration requests that result in the creation of a dataflow template, and then request execution of the dataflow. A template may be considered analogous to a compiled program in some embodiments, with instances being analogous to respective executions of the same compiled program. Multiple instances of the same dataflow may be run, potentially at least partly in parallel, in various embodiments. The information about the specific endpoints to be used for various templates, the authorization/authentication details needed to request the instances, etc., may be communicated by the TDA service providers 195 (and/or the MDOS itself) to the TDA service clients 196 using any appropriate communication mechanism in different embodiments, e.g., via one or more web sites, e-mails or the like.

A given execution request indicating a template identifier may be submitted, e.g., by a TDA service client 196 using a message directed to such an endpoint via the MDOS programmatic interfaces 170 in the depicted embodiment. The TDA service clients 196 may be considered clients of the TDA service providers 195, with requests for the TDA service being offered by a given TDA service provider processed/fulfilled using the MDOS in various embodiments. In response to a given execution request, one or more authorization/authentication checks may be performed in the depicted embodiment, e.g., by request handlers 175, and if the results of the checks are acceptable, the execution request may be passed on for execution to template execution instance managers 165. Operations corresponding to individual nodes of the template DAG may be initiated, in the sequence indicated in the DAG in the depicted embodiment. For a given node representing a function, one or more execution platforms (which may include resources of the MDOS's own execution node pool 152, a dynamic provisioning computing service 110, a pre-provisioned virtualized computing service 130, and/or other services) may be identified by function execution platform selectors 167 in the depicted embodiment. For example, for a particular stateless function, an API of the server-less dynamic provisioning computing service 110 may be invoked, resulting in the detection of an event by an event handler 112, the selection of a run-time platform 114 to be used for the function, and the execution of the function at the selected run-time platform, with the results being provided to the template instance execution managers 165. In another example, the MDOS may utilize one or more compute instances 132 (e.g., "guest" virtual machine set up on behalf of the MDOS or on behalf of MDOS clients at one or more virtualization servers) of a pre-provisioned virtualized computing service in some embodiments.

Interactions with data stores and/or transaction managers, e.g., at storage service(s) 120, corresponding to inferred I/O operations and transaction boundaries of the template, may be initiated and coordinated by data store interaction managers 169 in various embodiments. State information pertaining to one or more of the transactions of the dataflow may be read from and/or written to one or more storage servers 122 at one or more storage services, e.g., via inferred I/O operations included as nodes in the graph of the template in various embodiments. Note that one or more template graph nodes may represent inferred I/O operations that are not necessarily part of a transaction in at least some embodiments; such non-transactional I/O operations may also be performed by the data store interaction managers 169. In some embodiments, requests for proposed transactions (e.g., comprising a write set of a transaction, as discussed below in further detail) may be submitted to transaction managers 124 associated with one or more storage services. Results of individual ones of the operations/functions may be accumulated at the template instance execution managers 165 in various embodiments; when all the input needed for a subsequent operation/function has been obtained, that subsequent operation/function may be implemented.

In at least some embodiments, data structures representing the progress or status of respective executing dataflow instances may be maintained at the MDOS, and contents of such data structures may be viewed by MDOS clients 190 via the programmatic interfaces 170 as desired. Such data structures are referred to herein as "sheets". One or more progress "sheet" managers 171 may initialize such sheets in the depicted embodiment, and/or store versions of the data structures in volatile or persistent storage. In at least some embodiments, the results of various functions or I/O operations of a given execution, along with other metadata such as the times at which the functions/operations were initiated or completed, may be stored into a given sheet when available, e.g., by the services at which the work is performed and/or by components of the MDOS that request the work from the services. As discussed in further detail below, graphical user interfaces may be provided in various embodiments to enable clients to view the status/progress of in-progress dataflow instances, to view the directed graphs of verified templates, to view the persistent storage schemas deduced/inferred by the MDOS, and so on. After all the functions/operations of a given instance of a dataflow are completed, an indication of the completion of the instance may be provided to the execution requester (e.g., in the form of an output value or result) and/or to one or more other destinations in at least some embodiments. If one or more of the transactions or other operations of the instance fail, an error or failure indicator may be provided in some embodiments. In some embodiments, at least some of the dataflows may be idempotent by design—that is, if one request to perform the work of the dataflow fails, a later request with the same parameters may be submitted without concerns regarding partial success of the original request. Traces representing the progress data structures may be stored, e.g., so that they can be used for debugging/analysis, in one embodiment.

In at least some embodiments, several of the services shown in FIG. 1, including for example the MDOS 105, the server-less dynamic provisioning computing service 110, storage services 120, and/or pre-provisioned virtualized computing service 130 may be implemented as part of a provider network or cloud computing environment. In one embodiment, internal components of one or more of the provider network services may also utilize the MDOS for coordinating complex tasks. For example, in response to a request to instantiate one or more compute instances on behalf of a client of virtualized computing service 130, a non-trivial workflow involving functions performed at several different internal control plane services 133 (e.g., a provisioning service, a compute instance placement service, a compute instance networking configuration service, and so on) may have to be orchestrated. Such workflows may also be managed using the MDOS 105 in some embodiments, e.g., by submitting requests defining the inputs and outputs of various stateless functions, storing templates with inferred I/O operations, and executing instances of such templates in some embodiments. As such, one or more other network-accessible services of a provider network may represent clients of the MDOS 105 in various embodiments.

Example Response to Dataflow Orchestration Request

Figure 2:
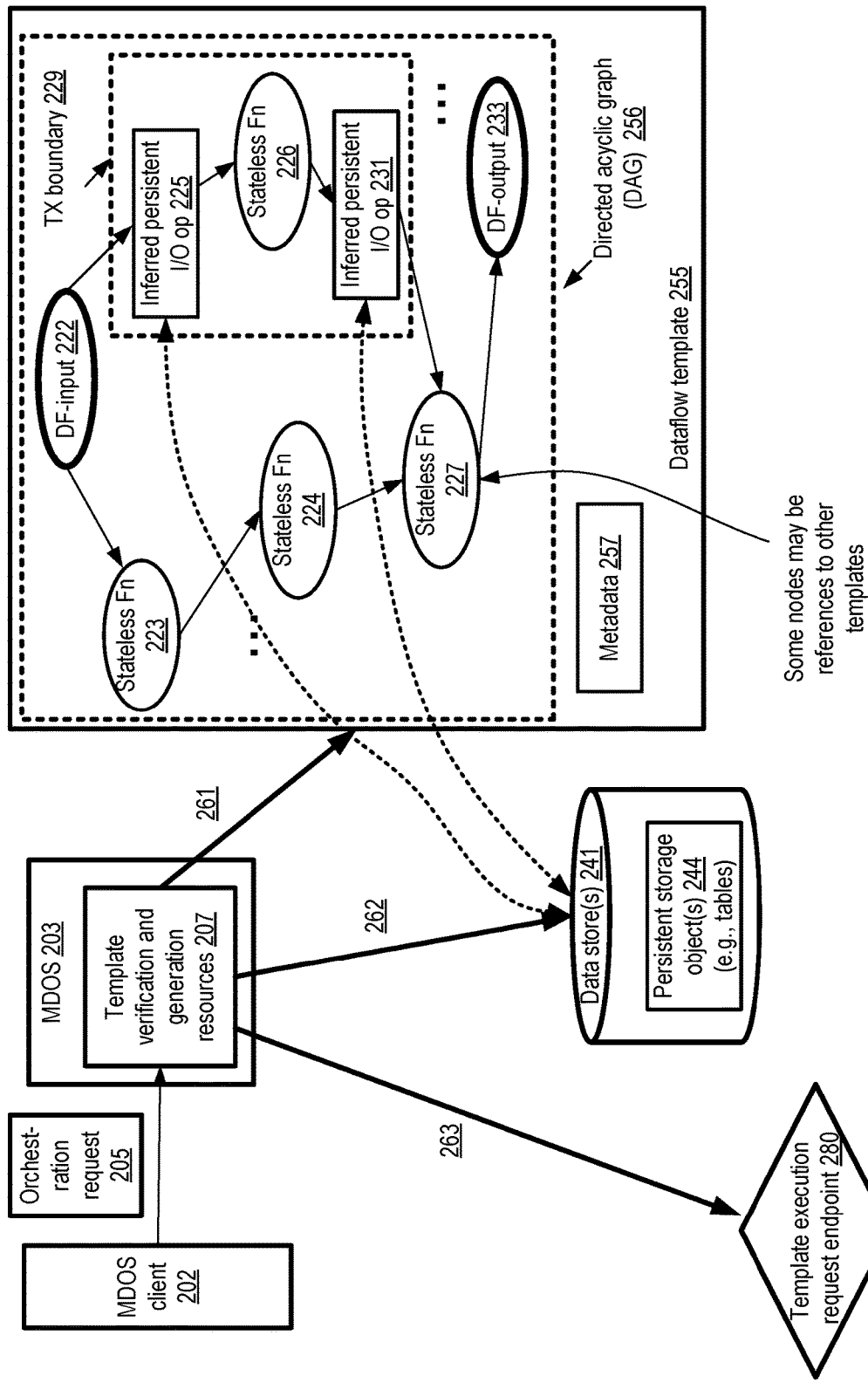
FIG. 2 illustrates example actions that may be performed in response to a dataflow orchestration request, according to at least some embodiments

FIG. 2 illustrates example actions that may be performed in response to a dataflow orchestration request, according to at least some embodiments. As shown, a client 202 of a multi-service dataflow orchestration service (MDOS) 203, similar in features and functionality to MDOS 105 of FIG. 1, may submit an orchestration request 205 which is eventually processed at a set of template verification and generation resources 207 of the MDOS. In some embodiments, the orchestration request 205 may initially be received at a request handler of the MDOS 203, which may perform some preliminary operations such as verifying that the client 202 has appropriate credentials to submit such a request, verifying the structure or syntax of the request, and so on, before further analysis of the request 205 by template verification and generation resources 207 of the MDOS 203 begins. Orchestration requests 205 may be referred to as template creation requests or template generation requests in various embodiments.

In the depicted embodiment, an orchestration request 205 may comprise a plurality of function descriptors, as well as an indication of the overall input and output of the task or dataflow to be orchestrated. A given function descriptor may indicate a set of inputs and outputs (e.g., the data types or object types of the inputs and outputs) of a corresponding stateless or side-effect-free function in some embodiments. In one embodiment, the request may also include one or more types of annotations or hints, as discussed below in the context of FIG. 3. The request 205 may not specify the order or sequence in which the functions are to be executed, the specific computing resources or services to be used to perform the functions, or any data stores or storage services to be employed to read or write data associated with the tasks to be accomplished using the functions in at least some embodiments.

At the MDOS template verification and generation resources 207, the contents of the orchestration request may be analyzed, e.g., to determine a sequence in which the functions can be executed, and/or to determine whether any I/O operations (reads or writes of persistent data) associated with the functions is to be performed in the depicted embodiment. In various embodiments, for example, based at least in part on a comparison or matching of the input and output data types of the different functions indicated in the orchestration request 205, a dataflow template 255 comprising a directed acyclic graph 256 may be generated. Nodes of the generated graph may include, for example, one or more overall data flow input nodes (e.g., DF-input 222), respective nodes representing individual ones of the stateless functions in the request (e.g., stateless functions 223, 224, 226 and 227), and/or one or more nodes representing inferred persistent I/O operations (e.g., nodes 225 and 231). In one embodiment, one or more of the nodes (such as stateless function node 227) may be references to other templates, e.g., to templates that have already been generated and stored in the MDOS; as such, more complex dataflow templates may be constructed using simpler templates (which were among the stateless functions indicated in the orchestration request). In some embodiments, a node of the dataflow template may represent an invocation of a web service request, e.g., an HTTP (Hypertext Transfer Protocol) or HTTPS (HTTP-secure) request directed to an address accessible via the public Internet or a private Internet Protocol (IP) address. In various embodiments, one or more of the functions may involve invocations of network-accessible services other than the MDOS, e.g., using respective service APIs of the other services.

In at least some embodiments, the DAG 256 and/or associated metadata 257 may include transaction boundaries, such as transaction boundary 229 which indicates that I/O operation 225, stateless function 226 and I/O operation 231 are to be performed as an atomic transaction. In some embodiments transaction boundaries may be indicated at least partly by annotations in the request 205, while in other embodiments the MDOS template verification and generation resources may infer at least some transaction boundaries. In some cases, a template may include a transaction with several nodes that represent invocations of respective other services and/or reads/writes of several different data stores; a transaction may not necessarily be limited to a single invoked service or data store. The DAG may also include a node (e.g., DF-output 233) indicating the eventual results produced by the function computations and I/O operations in at least some embodiments. The directions of the edges in the DAG 256 may indicate the sequence in which functions and I/O operations are to be performed—e.g., function 223 may be performed before function 224, I/O operation 225 may be performed before function 226, and so on. Such sequencing may be inferred by the MDOS 203 in the depicted embodiment, e.g., also based at least in part on analysis of the function descriptors. Note that while a relatively example DAG 256 with a small number of nodes is shown in FIG. 2 to illustrate the concepts involved, the number of nodes and the complexity of the DAG may be significantly greater in practice in various embodiments. Metadata 257 may include, for example, permissions or authorizations indicating the roles/users/groups that can request execution of instances of the dataflow indicated in DAG 256, a template version number, a unique template identifier and so on in different embodiments. A persistent representation of the generated dataflow template 255 may be stored in a repository in various embodiments.

For some types of dataflows, in addition to generating and storing the dataflow template 255, as indicated by arrow 261, one or more other types of objects or artifacts may be created in some embodiments to fulfill the dataflow orchestration request 205. For example, as indicated by arrow 263, in some cases, the MDOS 203 may create one or more persistent storage objects 244 (e.g., database tables) at one or more data stores 241 to store data that may be written during execution of the dataflow and/or read during execution of the dataflow. The MDOS 203 may select the particular type of data store to be used (e.g., whether a key-value store is to be used, a relational database is to be used, and so on), the particular instance of the data store (e.g., a database established at a provider network's storage service) to be used, the schema of the storage object 244, and various other persistence-related implementation details, in at least some embodiments. Note that in the depicted embodiment, the orchestration request 205 may not include such details as the names or schemas of specific tables/objects to be created/used, the data store to be used, connectivity information (e.g., network addresses, credentials etc.) to be used to communicate with the data store, and so on; such parameters may be selected by the MDOS 203 based on the analysis of the orchestration request 205.

In some embodiments, as part of the operations performed to complete fulfillment of an orchestration request 205, the MDOS 203 may also set up (or at least select parameters that may be used to set up) a networking endpoint 280 corresponding to the template 255, as indicated by arrow 263. Such an endpoint may be configured by the MDOS, for example, so that information about the endpoint can be propagated to dataflow end users by the submitter of the orchestration request in the depicted embodiment. After the information about the endpoint is propagated, the endpoint may later be used to submit requests for executing instances of the dataflow represented by the template 255 in various embodiments. In some embodiments, for example, an endpoint 280 may comprise an Internet Protocol (IP) address of a request handler of the MDOS which is configured to receive dataflow execution requests. In some embodiments, such endpoints 280 and/or new persistent objects 244 may not be created in response to at least some orchestration requests.

Example Dataflow Orchestration Request Elements

Figure 3:
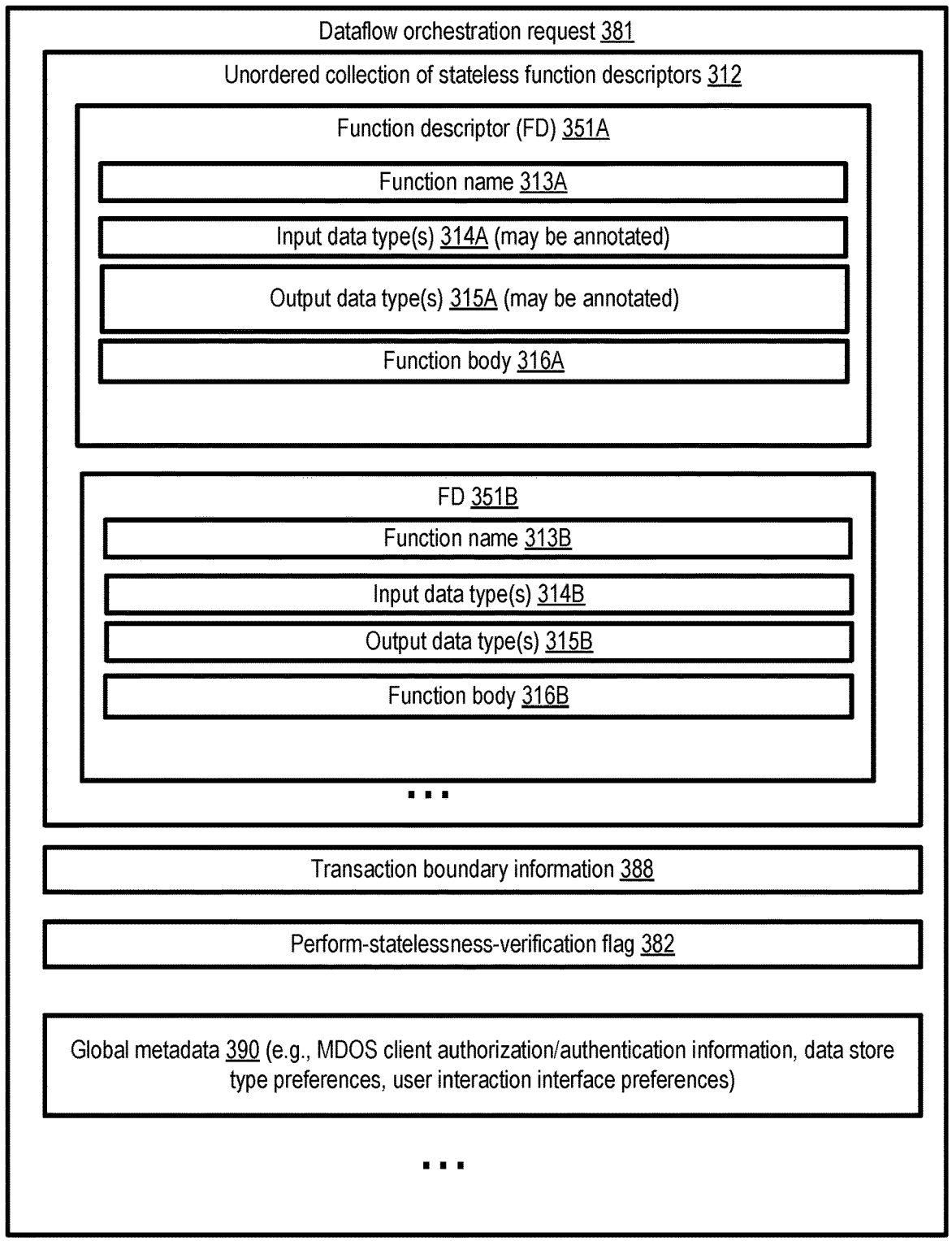
FIG. 3 illustrates example elements of a dataflow orchestration request, according to at least some embodiments.

FIG. 3 illustrates example elements of a dataflow orchestration request, according to at least some embodiments. As shown, a dataflow orchestration request 381, which may be submitted to a multi-service dataflow orchestration service (MDOS) similar to MDOS 105 of FIG. 1, may comprise an unordered collection or "bag" of stateless function descriptors 312 in the depicted embodiment. A given function descriptor (FD) 351, such as 351A or 351B, may include, for example, a function name 313 (e.g., 313A or 313B), an indication of the input data types 314 (e.g., 314A or 314B) of the function, an indication of the output data types 315 (e.g., 315A or 315B) of the function, and a body 316 (e.g., 316A or 316B) of the function comprising source code implementing the logic of the function. The order in which the inputs are to be provided, and/or the order in which the outputs are returned, may also be indicated in one embodiment. In some embodiments, the body of the function may be written in a general-purpose programming language (e.g., C, C++, Java' or the like), while in other embodiments a functional programming language such as Haskell, Scala, Erlang or the like may be used, or a custom programming language/interface of the MDOS or one or more invoked services may be used.

In one embodiment, one or more of the input and/or output data types of a given function may be annotated, e.g., to indicate persistence properties associated with the input or output data types (e.g., whether a value of a given output should be stored at some persistent data store, or whether a value of a given input should be obtained from a persistent data store), and/or to indicate that the corresponding data should be used as a key for partitioning or sharding data objects such as tables used to store data pertaining to the dataflow. Such partition key indicating annotations may be used, for example, by the MDOS to indicate, to a data store scalability manager, the specific object attributes that may be used to automatically redistribute (e.g., using hashing or other mapping functions) contents of one or more tables or other storage objects among a plurality of storage devices as the workload on the tables or storage objects increases. Note that at least in some embodiments, the input and/or output data types of a given function may include other functions— that is, functions may be considered examples of data types. In some embodiments, one or more functions that have already been defined and registered at the MDOS may be re-used by reference within a dataflow orchestration request. For example, a given client C1 of the MDOS may define a stateless function F1 as part of a first dataflow DF1, with the body of F1 being provided as part of the orchestration request OR1 for DF1. DF1 may then be registered or recorded within the MDOS. Later, such a pre-registered function F 1 may be re-used within another data flow for which another orchestration request OR2 is submitted, and the body of the function may not have to be re-provided to the MDOS in OR2. In at least some embodiments, a function descriptor 351 may comprise a reference to a different dataflow template—e.g., nodes of one template may represent other templates. In at least some embodiments, in addition to annotations for individual inputs and/or outputs, a given function descriptor 351 may include function-level annotations (e.g., annotations indicating whether the function is to be registered for possible re-use or not, preferred types of execution platforms for the function, and so on).

In at least some embodiments, an orchestration request 381 may include optional transaction boundary information 388, e.g., indicating that a set of functions is to be executed within an atomic transaction. In other embodiments, the MDOS may infer one or more transaction boundaries (e.g., the set of functions and/or I/O operations to be performed as a unit between a "transaction-start" event and a corresponding "transaction-end" event) of a dataflow. In one embodiment, an optional flag 382 may be set in the orchestration request to indicate that the MDOS should perform at least some level of checking or testing to verify that one or more of the functions of the dataflow are in fact stateless (i.e., that the functions do not have side effects and are thus "pure" functions from a functional programming perspective). Such testing may be performed, for example, by running the function(s) within an isolated sandbox environment from which data cannot be written to or read from external destinations/locations, and verifying that the functions complete successfully in such restricted environments. In at least some embodiments, the orchestration request 381 may include optional global metadata 390 pertaining to the dataflow, such as authorization/authentication information or requirements, data store type preferences, user interaction interface preferences, and so on. In one embodiment, one or more of the elements shown in FIG. 3 may not necessarily be included in an orchestration request.

Example Programmatic Interactions to Finalize Dataflow Templates

Figure 4:
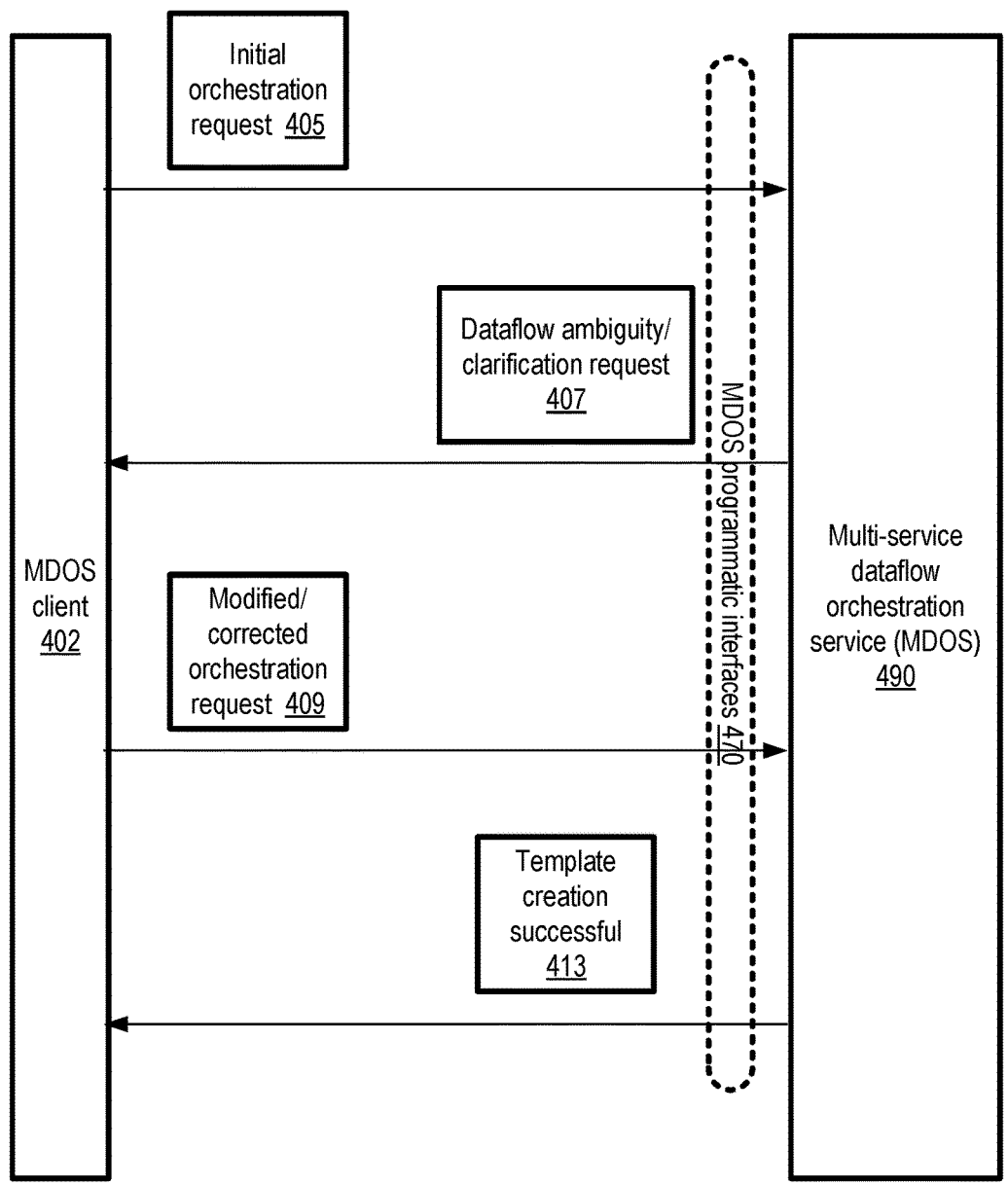
FIG. 4 illustrates an example sequence of programmatic interactions that may collectively result in the creation of a dataflow template, according to at least some embodiments.

FIG. 4 illustrates an example sequence of programmatic interactions that may collectively result in the creation of a dataflow template, according to at least some embodiments. A client 402 of a multi-service dataflow orchestration service (MDOS) 490 may submit an initial orchestration request 405, comprising elements similar to elements of request 381 of FIG. 3, using MDOS programmatic interfaces 470 in the depicted embodiment. The programmatic interfaces 470 may for example include APIs, web-based consoles, command line tools, graphical user interfaces or the like. In response, the contents of the received request 405 may be analyzed, e.g., to determine feasible sequences in which the stateless functions indicated may be executed, to infer I/O operations and to decide which combinations of functions and I/O operations are to be performed as part of respective transactions. MDOS 490 may be similar in features and functionality to MDOS 105 of FIG. 1.

In some cases, based for example at least partly on the analysis of the input and output data types of the functions (including any annotations that were included in the request 405), an unambiguous directed acyclic graph of the kind discussed in the context of FIG. 2 may be constructed by the MDOS 490. In some embodiments, the MDOS may be unable to generate a complete graph for a template corresponding to the request 405, and/or unable to determine required parameters of one or more I/O operations or transactions to be incorporated in such a template. Such problems may arise for any of a number of reasons: for example, because the inputs and/or outputs of the stateless functions cannot be used to unambiguously determine the sequencing of one or more pairs of functions, because a partitioning or sharding key cannot be identified or determined for a storage object that is to be created for the requested dataflow, because a transaction boundary (indicated by annotation in the orchestration request, or inferred by the MDOS) spans more than a desired threshold number of functions or I/O operations, and so on. A number of verification tests may be conducted at the MDOS on the contents of the orchestration request (e.g., by template verification resources similar to resources 155 of FIG. 1) in some embodiments, e.g., to ensure that a partitioning key has been identified for at least some data store objects/tables that may be created to store state information pertaining to the request, to ensure that transactions of the dataflow meet criteria defined at the MDOS (e.g., criteria that define the maximum acceptable transaction length, in terms of the count of functions and/or I/O operations invoked), to ensure that functions are in fact stateless, etc.

If at least some of the verification tests fail, and/or if the MDOS is unable to construct a DAG with desired properties, a request to modify/enhance/clarify the orchestration request may be sent to the MDOS client 402 in the depicted embodiment via programmatic interfaces 470. Such a dataflow ambiguity/clarification request 407 request may indicate the problems found in the analysis of the orchestration request in at least some embodiments, and/or provide suggestions as to the manner in which the orchestration request should be modified to overcome the problems identified. The client 402 may eventually submit a modified/corrected orchestration request to the MDOS 490 in some embodiments. If the modified request satisfies the criteria of the MDOS, it may be accepted, a corresponding template comprising a DAG similar to that shown in FIG. 2 may be generated and stored, and a message 413 indicating that the template was created successfully may be sent to the client. If problems are identified during the analysis of the modified orchestration request 409, additional iterations in which the MDOS requests modifications and the client sends new modified versions of the request may be performed in at least some embodiments. If it is not possible to generate a template with a DAG despite one or more attempts to obtain corrections/clarifications, in some embodiments the MDOS may reject the orchestration request.

Example Response to Dataflow Execution Request

Figure 5:
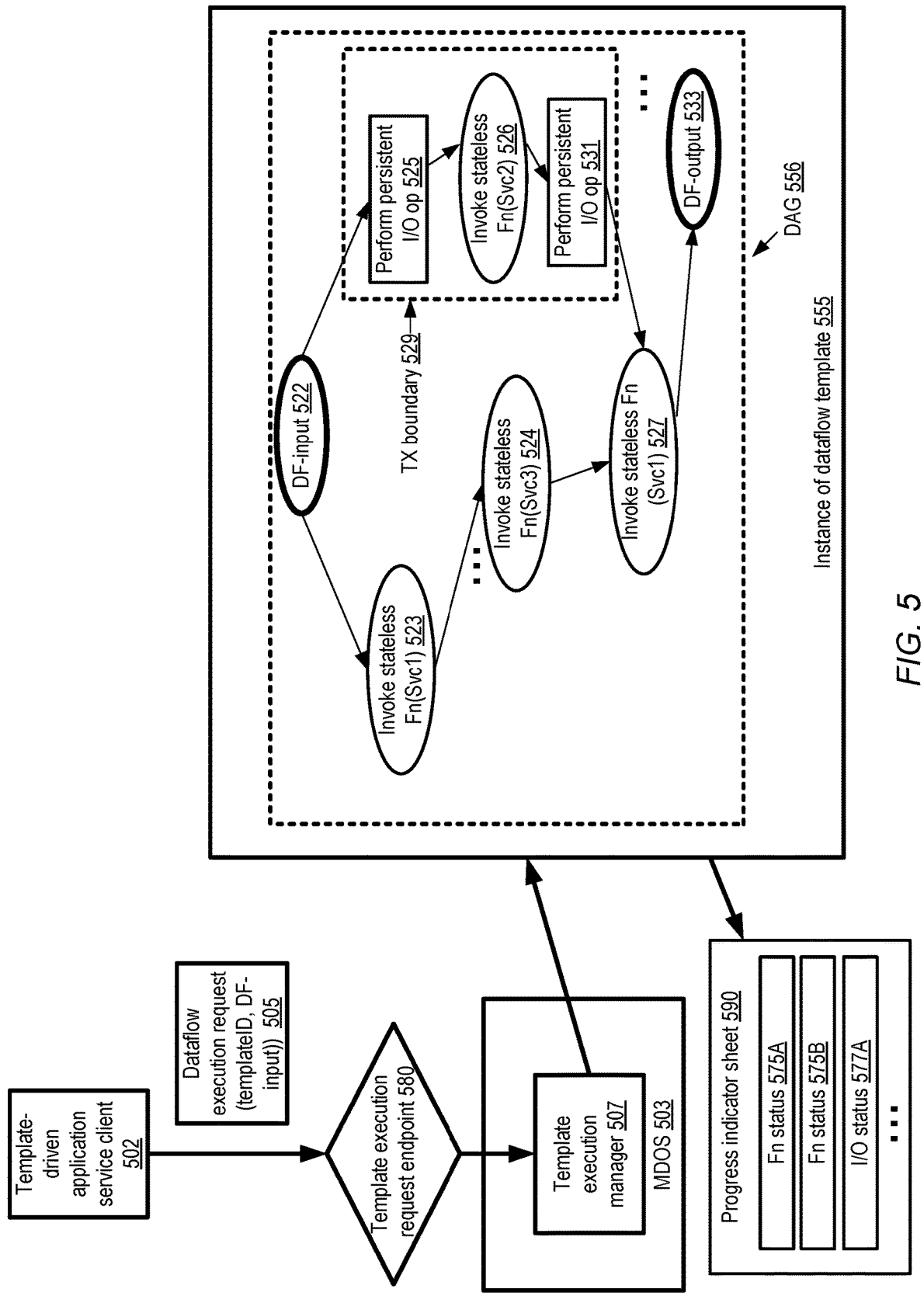
FIG. 5 illustrates example actions that may be performed at an orchestration service in response to a request to execute an instance of a dataflow, according to at least some embodiments.

FIG. 5 illustrates example actions that may be performed at an orchestration service in response to a request to execute an instance of a dataflow, according to at least some embodiments. A dataflow execution request 505 may be submitted by a client 502 of a template-driven application service in the depicted embodiment, e.g., using programmatic interfaces of an MDOS 503 similar in functionality to MDOS 105 of FIG. 1. In some embodiments, the execution request 505 may be directed to a request endpoint 580 that was created in response to an orchestration request, as discussed in the context of FIG. 2. In at least some embodiments, the dataflow execution request 505 may indicate the previously-created template of which an instance is to be created, e.g., by supplying a template identifier (templateID in FIG. 5), and values of the input parameters of the dataflow (e.g., corresponding to the DF-input node 522 of an instance 555 of the dataflow template 556 whose execution is being requested).

In response to the execution request, the MDOS 503 may first verify that the requester is authorized to request the dataflow, and also confirm that the template indicated in the request has been previously stored in the MDOS template repository. If these criteria are met, and any other preliminary requirements being implemented at the MDOS 503 are satisfied, the execution of an instance of the DAG 556 may be initiated. The input 522 of the dataflow may be provided as part of the invocation of the initial stateless functions and/or I/O operations (e.g., function 523 and I/O operation 525) in the depicted embodiment, with the results of those functions or I/O operations being provided to subsequent functions or I/O operations as they become available. Note that in a scenario in which outputs from several different DAG nodes are to be collectively used as input for another node, due to the asynchronous and distributed nature of the operations it may sometimes be the case that some of the outputs may become available earlier than others, so the MDOS may have to wait to accumulate all the needed input fields. Transaction requests may be submitted by the MDOS in various embodiments, e.g., to transaction managers of one or more data stores at which inferred I/Os are performed as required based on the transaction boundaries of the template, such as boundaries 529 shown in FIG. 5. Any combination of a variety of resource types may be used to execute the computations of the functions in different embodiments—e.g., depending on the types of operations to be performed, the MDOS may use its own execution resources, invoke other services such as a server-less dynamic provisioning computing service, a virtualized computing service or the like for one or more nodes. In the example shown in FIG. 5, a service Svc1 may be used for stateless functions 523 and 527, another service Svc2 may be used to execute function 526, and a third service Svc3 may be employed for function 524. In at least some embodiments, decisions as to which service or resource is to be used for a given node of DAG 556 may be made by the MDOS (e.g., by execution managers 507), without guidance being provided by the client 502 or by the entity on whose behalf the template was created. In various embodiments, decisions regarding data store choice, persistent object schemas, and/or transaction boundaries, which may have been made during the process of verifying and generating the template, may govern details of the manner in which I/Os and other operations are performed at run-time as part of the execution of the instance.

As mentioned earlier, in at least some embodiments, data structures representing the progress or status of respective executing dataflow instances such as instance 555 may be maintained at the MDOS, and at least a portion of the contents of such data structures may be exposed to MDOS clients as desired. Such data structures may be termed progress indicator sheets 590 in some embodiments. In at least some embodiments, the results of various functions or I/O operations of a given dataflow template instance, along with other metadata such as the times at which the functions/operations were initiated or completed, may be stored into a given sheet when available, e.g., by the services at which the work is performed and/or by components of the MDOS that request the work from the services. After all the functions/operations of a given instance of a dataflow are completed, an indication of the completion of the instance may be provided to the execution requester (e.g., in the form of an output value or result DF-output 533) and/or to one or more other destinations in at least some embodiments. Traces representing the progress data structures may be stored, e.g., so that they can be used for debugging/analysis, in one embodiment. Dynamically updated views of the sheet 590 (with new results or status information 575, e.g., function status 575A, function status 575B or I/O status 577A being added to the sheet as it becomes available) may be provided in at least some embodiments, e.g., via graphical user interfaces. In at least one embodiment, sheets may be implemented using a write-once or append-only methodology, such that overwrites or modifications of existing values in the sheet may not be permitted. In such embodiments, the sheet may represent an immutable ledger of status changes of the dataflow instance, which can be very helpful for debugging or other types of analysis.

Example Dataflow Operation State Transitions

Figure 6:
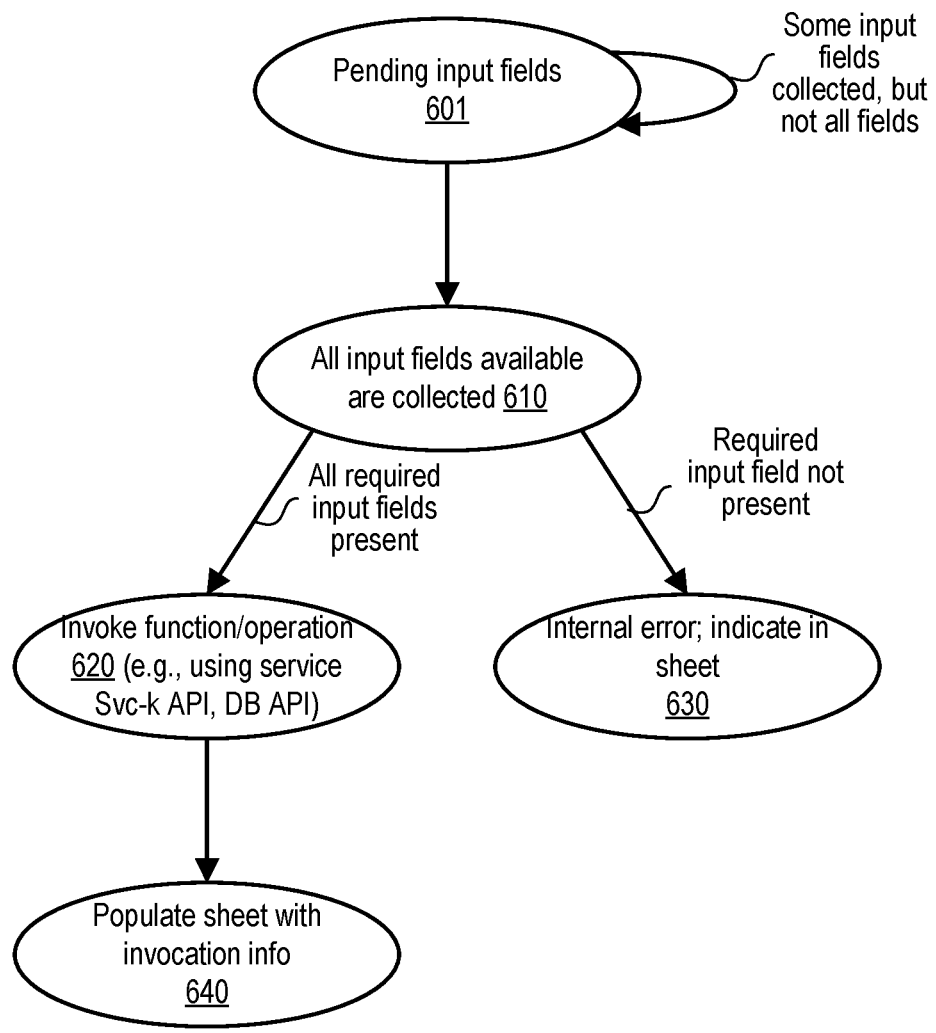
FIG. 6 illustrates state transitions associated with a function or I/O operation performed as part of a dataflow execution, according to at least some embodiments.

In at least some cases, as mentioned earlier, due to the asynchronous and distributed nature of the operations that are performed to execute a given dataflow instance, the MDOS may sometimes have to wait before all the inputs needed for a given function or I/O operation become available. As such, a state machine or some other technique for managing asynchronous inputs and outputs associated with dataflow DAG nodes may have to be maintained in various embodiments, even though the computations of the functions represented by various nodes may themselves be stateless. Such state machines may also, for example, be used to populate progress indicators such as sheets of the kind described earlier in various embodiments. FIG. 6 illustrates state transitions associated with a function or I/O operation performed as part of a dataflow execution, according to at least some embodiments. In an initial state 601, fields of data representing inputs to a given node may be incomplete. While the respective values of various fields are collected but not all of the field values have yet been collected, the state diagram may remain in the pending input fields state 601.

When values of all the input fields have been collected, state 610 may be entered with respect to the node in the depicted embodiment. If a required input field is not present, then the state diagram may transition to a state 630 representing an internal error, and an indication of the error may be loaded into a sheet. If all required fields are present, the state diagram may transition to another state 620 in which the operation or function is invoked, e.g., using an API of a particular computing service or data store selected by the MDOS. The flow diagram may then transition to a state 640 in which fields in the corresponding sheet are populated, e.g., by the service that was invoked in the state 620 or by the MDOS itself.

Example Interactions with Data Stores

Figure 7:
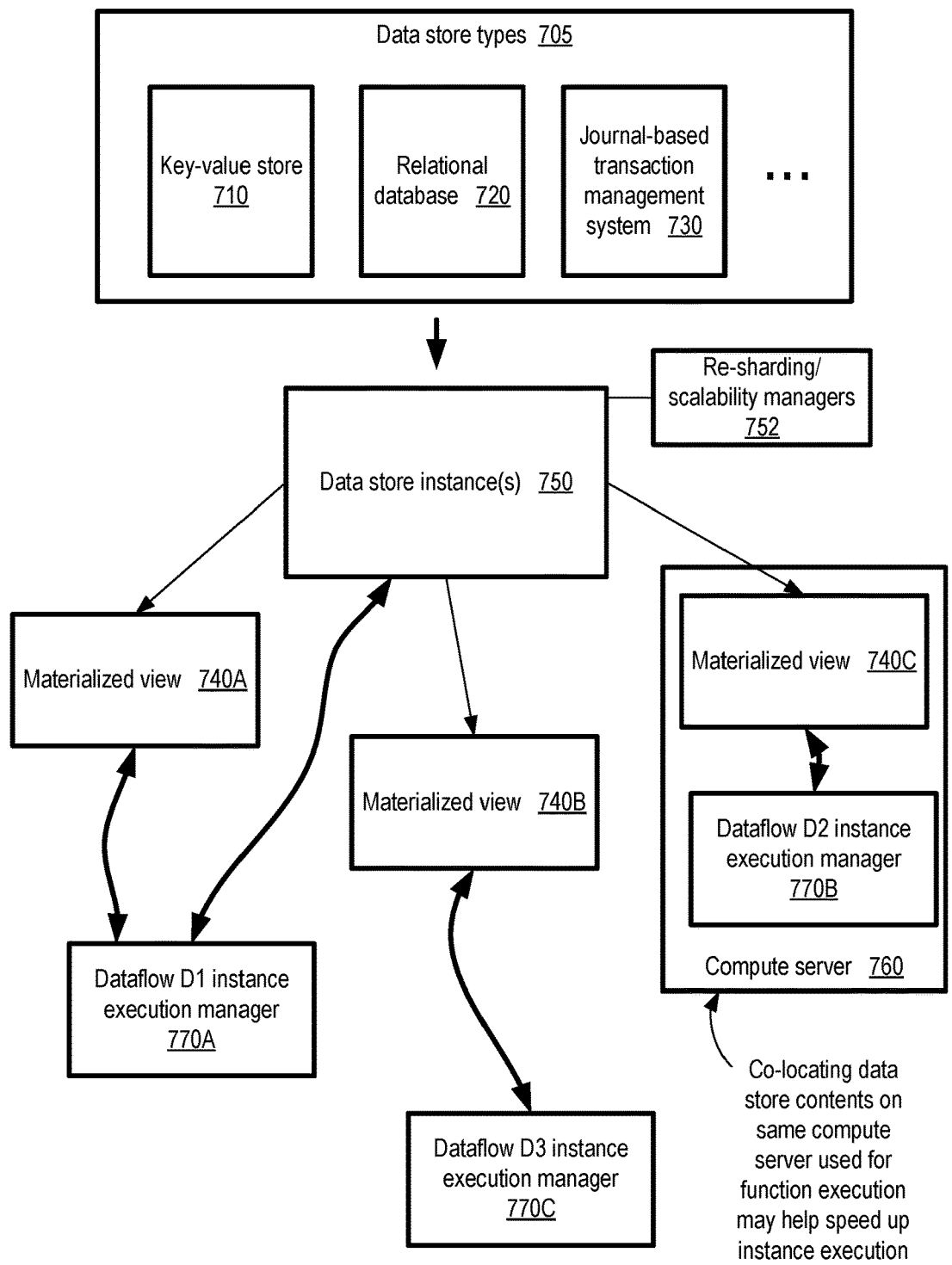
FIG. 7 illustrates examples of interactions between dataflow instance execution resources and data stores, according to at least some embodiments.

Any of a variety of data stores and/or network-accessible storage services may be employed by a multi-service dataflow orchestration service (MDOS) to store persistent data pertaining to dataflows, e.g., to store templates as well as to execute instances of dataflows corresponding to the stored templates. FIG. 7 illustrates examples of interactions between dataflow instance execution resources and data stores, according to at least some embodiments. As shown, the MDOS may elect to use instances 750 of a combination of one or more data store types 705 in the depicted embodiment, such as non-relational key-value stores 710, relational databases 720, journal-based transaction management systems 730, and so on. Individual ones of the data store instances 750 may have associated re-sharding or scalability managers configured in various embodiments. Such data store scalability managers 752 may, in some embodiments, automatically redistribute contents of one or more persistent storage objects such as tables across a set of storage devices as the workload directed to the storage objects increases, e.g., based on a hash function or other similar mapping functions applied to a partitioning attribute of the persistent storage object, without being explicitly requested to redistribute the object contents. Such redistributions may be termed re-partitioning or re-sharding in some embodiments. The partitioning attribute for a given persistent storage object such as a table accessed in a dataflow may be indicated to the scalability manager by the MDOS in various embodiments. In some embodiments, partitioning attributes may be indicated in annotations in a submitted orchestration request (e.g., one or more input data types or output data types of stateless functions may be annotated as partitioning keys); in other embodiments, the MDOS may determine the partitioning keys for one or more storage objects without receiving specific input about partitioning keys from clients.

During execution of a given instance of a dataflow, an MDOS execution manager 770 (e.g., 770A or 770C) may access some data stores (and/or materialized views of the data stored at such stores) via network connections in at least some embodiments. For example, as shown, Dataflow D1 instance execution manager 770A, which may be similar in functionality and features to template instance execution managers 165 of FIG. 1, may access materialized view 740A comprising at least a portion of data stored at one or more data store instances 750 over a network connection. In addition, execution manager 740A may also use one or more network connections to access the data store instances 750 themselves, e.g., for some types of inferred I/O operations that cannot be completed by accessing materialized view 740A alone in the depicted embodiment. In contrast, dataflow D3 instance execution manager 770C may access materialized view 740B over the network, and may not necessarily have to communicate with a data store instance directly.

In at some embodiments, it may be possible for the MDOS to co-locate at least a portion of a materialized view (such as view 740C) and an instance execution manager (e.g., dataflow D2 instance execution manager 770B) on the same server 760, such that network communication is not needed for at least some of the I/O operations pertaining to the instance. Co-locating data store contents on the same computing devices/servers that are used for executing the functions of a dataflow instance may help to speed up the execution of the instance considerably in such embodiments. In some embodiments in which a journal based transaction management system 730 is used by an MDOS, the MDOS may cause write appliers to be set up that store selected subsets (or all) of the committed data corresponding to journal entries at desired computing devices such as server 760 for co-location purposes. Additional details regarding such journal-based transaction management systems are provided below in the context of the discussion of FIG. 8. In at least one embodiment, instead of or in addition to co-locating materialized views such as 740C with the execution resources used for one or more nodes of the DAG representing a dataflow, the MDOS may co-locate an entire data store instance (or a portion of a data store instance) with the execution resources. By causing at least a portion of a data store to be co-located at an execution platform at which one or more of the functions of an instance of the dataflow are executed, considerable reduction in the time taken to complete the dataflow instance may be achieved in at least some embodiments. Note that in some embodiments, a given transaction of a dataflow instance may include reads from or writes to more than one data store instance, e.g., a single transaction may access a relational database instance as well as a key-value store instance. In at least one embodiment, as mentioned earlier, the details of exactly which data store types or instances are to be used for a given dataflow, the schema of one or more storage objects such as tables created for the dataflow, the establishment/termination of network connections to data store instances or materialized views, and so on, may be determined by the MDOS based on the analysis of the stateless functions of an orchestration request, thereby eliminating the need for a dataflow application developer/designer to make storage related decisions.

Example Journal-Based Transaction Management System

Figure 8:
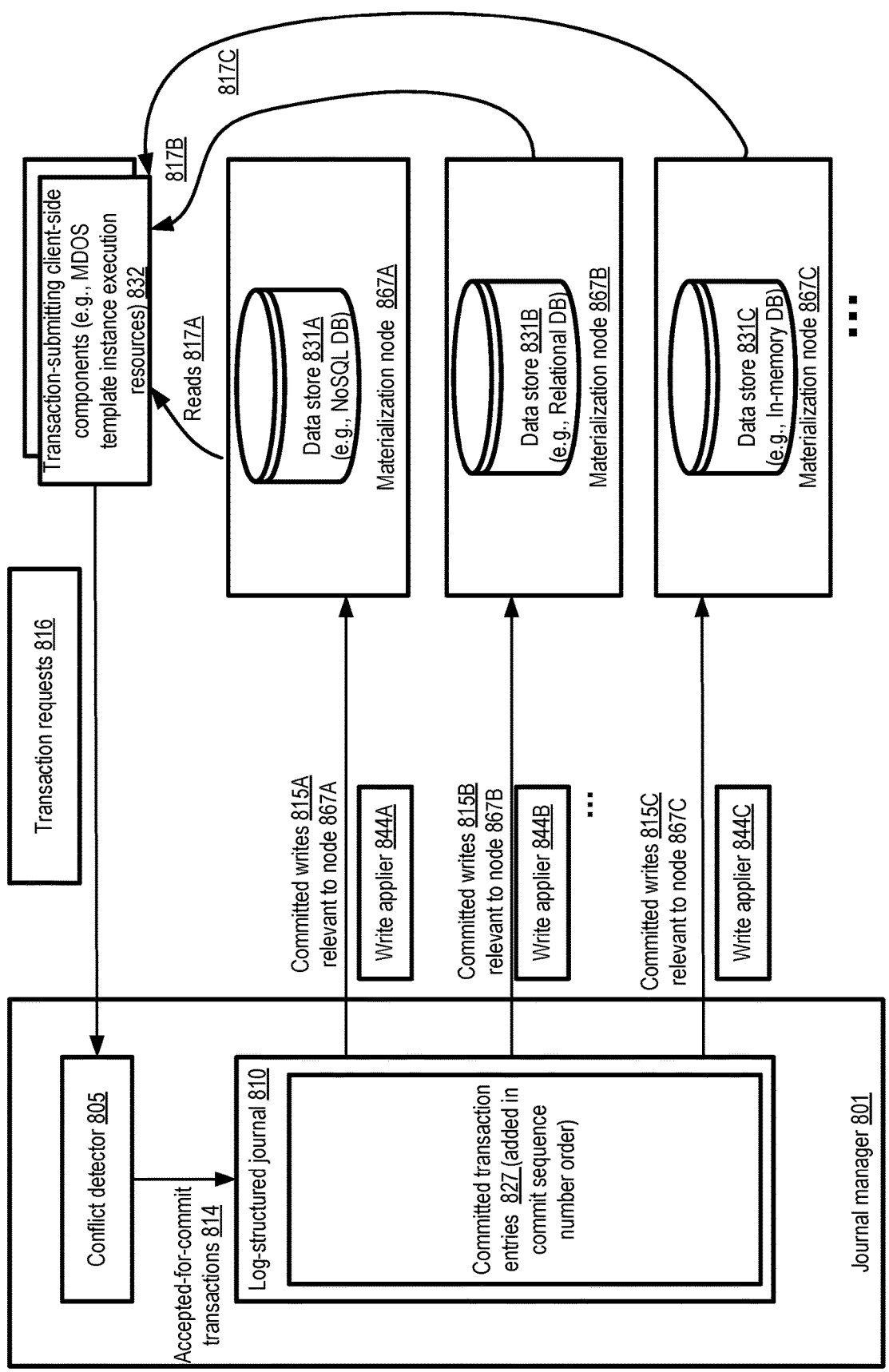
FIG. 8 illustrates an example of a journal-based transaction management system that may be employed in some embodiments by an orchestration service, according to at least some embodiments.

FIG. 8 illustrates an example of a journal-based transaction management system that may be employed in some embodiments by a dataflow orchestration service, according to at least some embodiments. A journal manager 801 of a log-structured journal 810 used to store records of state changes of a multi-data-store database may be implemented using one or more computing devices in various embodiments. One or more components of a multi-service dataflow orchestration service (MDOS) may submit transaction requests 816 as clients 832 of the journal manager in the depicted embodiment, and/or perform reads from the materialization nodes 867 at which data written in committed transactions of the journal are stored. The journal may be described as being log-structured in the depicted embodiment in that it may comprise an append-only sequence of entries, with in-place modification of entries not permitted. The journal may comprise committed transaction entries 827 stored in the order in which the corresponding transactions or state changes were approved, e.g., in increasing order of commit sequence numbers. The database may include one or more materialization nodes 867, such as 867A-867C, at each of which at least a subset of the database contents are materialized. Each materialization node may include at least a portion of a respective data store 831 instance (e.g., data stores 831A-831C) and a corresponding data store manager implemented at one or more computing devices. In some embodiments, a journal schema may specify or govern various aspects of transaction management in the system of FIG. 8—e.g., the syntax of a data-store-independent transaction language in which transaction requests are to be submitted to the journal manager by client-side components 832 (including the MDOS's template instance execution resources), and/or the data types and attributes which can be referenced in such requests.

The data stores 831 may be referred to as member data stores of the database or storage system of FIG. 8. The member data stores 831 may differ from each other in various characteristics such as their supported data models and/or data manipulation languages, level of data consistency supported, transaction support, data persistence/durability level, and the like. For example, data store 831A may comprise an instance of a NoSQL or non-relational database that does not implement a standard version of the structured query language (SQL)), data store 831B may comprise an instance of a relational database, and data store 831C may comprise an instance of an in-memory database. Each of the data stores may be registered for transaction management by the journal manager 801 in the depicted embodiment. The terms "concurrency control" and "transaction management", may be used as synonyms in various embodiments with respect to the state change management functionality provided by the journal manager. In effect, the journal manager may be responsible for implementing a replicated state machine corresponding to a collection of data objects indicated in a journal schema, with the committed transaction entries expressing state changes in a data-store-independent language in the depicted embodiment. In some embodiments, several different types of entries may be stored in the journal, including entries representing data modifications, journal schema modifications, redactions of other entries, and the like.

The term "data store", as used in various embodiments, may refer to an instance of any of a wide variety of persistent or ephemeral data repositories and/or data consumers. For example, some data stores such as 831A may comprise persistent non-relational databases that may not necessarily provide native support for multi-item transactions, while other data stores such as 831B may comprise persistent relational databases that may natively support multi-item transactions. In some embodiments, a network-accessible storage service of a provider network that enables its users to store unstructured data objects of arbitrary size, accessible via a web-services interface, may be registered as one of the data stores. Other types of data stores may comprise in-memory databases such as 831C, instances of a distributed cache, network-accessible block storage services, file system services, and the like.

In the depicted embodiment, transaction-submitting client-side components 832 (e.g., comprising software and/or hardware elements of one or more computing devices) may construct transaction requests locally, and then submit (or "offer") the transaction requests for approval and commit by the journal manager 801. In one implementation, for example, a client-side library may enable a client to initiate a proposed transaction by issuing the logical equivalent of a "transaction-start" request, e.g., at the starting point of a transaction indicate by a transaction boundary similar to boundary 529 of dataflow template instance 555 of FIG. 5. Within the candidate transaction, a client may perform some number of reads on a selected set of objects at data stores 831, and locally (e.g., in local memory) perform a proposed set of writes directed at one or more data stores. The client may then submit a request for a proposed transaction comprising the writes by issuing the equivalent of a "transaction-end" request. A transaction request 816 may be received at a conflict detector 805 of the journal manager 801 in the depicted embodiment. In general, in at least some embodiments, a given transaction request 816 may include a read set descriptor indicating one or more reads (e.g., reads 817A, 817B or 817C) respectively from one or more data stores, and a write set descriptor indicating proposed writes which may eventually be propagated to one or more data stores, where the set of data stores that are read in the transaction may or may not overlap with the set of data stores affected by the writes. The reads may be performed using the native programmatic read interfaces of the data stores in some embodiments. The transaction requests 816 may be formatted in accordance with a data-store-independent transaction language in various embodiments.

At least some of the writes indicated in a given transaction request may be dependent on the results of one or more of the reads in some embodiments. For example, a requested transaction may involve reading one value V1 from a location L1 at a data store DS1, a second value V2 from a second location L2 at a data store DS2, computing a function F(V1, V2) and storing the result of the function at a location L3 at some data store DS3. In some locking-based concurrency control mechanisms, exclusive locks may have to be obtained on L1 and L2 to ensure that the values V1 and V2 do not change before L3 is updated. In contrast, an optimistic concurrency control mechanism may be used by the journal manager 801 of FIG. 8, in which no locks may have to be obtained. Instead, in the depicted embodiment, the conflict detector 805 may determine, based at least in part on the contents of the transaction request and on a set of committed transaction entries of the journal 810, whether one or more of the data items read in the requested transaction may have been updated since they were read from their respective data stores. A sequence number based technique may be used to determine whether such read-write conflicts exist in at least some embodiments. If the conflict detector 805 determines that none of results of the proposed transaction's reads have been affected by subsequently committed writes, the requested transaction may be accepted for commit, and records representing such accepted-for-commit transactions 814 may be added to the journal 810.

If some of the transaction's read data was updated since the corresponding reads occurred (or if a probability that the data was updated is estimated by the conflict detector to be greater than a threshold), a requested transaction may instead be rejected or aborted in the depicted embodiment. This type of approach to concurrency control may be deemed optimistic in that decisions as to whether to proceed with a set of writes of a transaction may be made initially under the optimistic assumption that read-write conflicts are unlikely. As a result, in scenarios in which read-write conflicts are in fact infrequent, higher throughputs and lower response times may be achieved than may be possible if more traditional locking-based techniques are used. In the case where a transaction is accepted for commit, in some embodiments contents of a corresponding journal entry 827 may be replicated at some number of nodes of a replication graph in the depicted embodiment before the commit is considered successful. In some embodiments, the requesting client-side component 832 may be notified when the requested transaction is committed. In at least one embodiment, the client-side component 832 may be informed when a transaction is rejected, so that, for example, a new transaction request may be generated and submitted for the desired updates.

For each transaction that is committed, in at least some embodiments a commit sequence number (or some other identifier indicative of the commit) may be generated and stored as part of the corresponding journal entry. Such a commit sequence number may, for example, be implemented as a counter or as a logical timestamp. The commit sequence number may be determined, for example, by the conflict detector in some embodiments, or at a different component associated with the journal (such as the committer node of a replication graph being used) in other embodiments.

In the depicted embodiment, after a given transaction is committed and its entry is stored at the journal, at least some of the writes of the transaction may be applied or propagated to one or more of the materialization nodes 867, e.g., by a respective write applier 844 (e.g., write appliers 844A-844C) implemented at one or more computing devices. Different subsets of the committed writes may be of interest to, or relevant to, different materialization nodes in some embodiments, as indicated by arrows 815A-815C. In some implementations, the writes may be applied in an asynchronous fashion to the materialization nodes. Thus, in such implementations, there may be some delay between the time at which the transaction is committed and the time at which the payload of a particular write operation of the committed transaction reaches the corresponding data store. In some embodiments, respective asynchronous write appliers 844 may be used to propagate some or all of the writes to relevant data stores. In one embodiment, the write appliers may be components of the journal manager 801, while in other embodiments the write appliers may be components of the data stores 831, and may represent respective cursors on the journal. In some embodiments, a given write applier 844 may be responsible for propagating writes to more than one data store, or a single data store may receive writes from a plurality of write appliers 844. In at least one implementation, a pull technique may be used to propagate written data to the data stores—e.g., one or more data stores may submit requests for writes to the journal manager or the write appliers, instead of being provided written data at the initiative of the write appliers. After the data written during a transaction is applied to the corresponding data stores, client-side components may be able to read the updated data using the respective read interfaces of the data stores. In some embodiments, at least one of the write appliers may be capable of performing synchronous writes (e.g., either when explicitly directed to do so by the journal manager, or for all the writes for which the applier is responsible). In at least one embodiment, as mentioned in the context of FIG. 7, a write applier 844 may be established at the request of an MDOS, e.g., so that persistent data needed for execution of a dataflow instance can be co-located with the computing resources needed for the instance.

In at least one embodiment, the journal manager 801 may implement respective sets of read and write programmatic interfaces (e.g., application programming interfaces or APIs). The journal manager's write interfaces may be used by authorized entities (such as client-side components 832) to submit transaction requests, while the read interfaces may be used by various authorized entities (e.g., including write appliers 844 and/or the client-side components 832) to read contents of journal entries 827.

In some embodiments, in addition to a read set descriptor and a write set descriptor, a given transaction request 816 may include the write payload (i.e., the set of data bytes that are to be stored for each write), a conflict check delimiter (an indication of a subset of the committed transaction entries that should be examined to accept/reject the transaction), and/or other elements such as a transaction type indicator. Some or all of these constituent elements of a transaction request may be stored within the corresponding journal entry together with the commit sequence number for the transaction. In at least one embodiment, the journal manager 801 may provide an indication of the latest committed state of the database (such as the highest commit sequence number generated thus far), e.g., in response to a query from a client-side component. The write appliers 844 may indicate the commit sequence numbers corresponding to the writes that they apply in various embodiments. Thus, at any given point in time, a client-side component 832 may be able to determine the commit sequence number corresponding to the most-recently-applied write at a given materialization node 867. In at least some embodiments, during the generation of a transaction request 816, the most-recently-applied commit timestamps may be obtained from the data stores that are accessed during the transaction, and one or more of such commit sequence numbers may be indicated in the transaction request as the conflict check delimiter. For example, consider a scenario in which, at the time that a particular client-side component 832 initiates a transaction that includes a read of a location L1 at a data store DS1, the commit sequence number corresponding to the most recently applied write at DS1 is SN1. Assume further that in this example, the read set of the transaction only comprises data of DS1. In such a scenario, SN1 may be included in the transaction request 816. The conflict detector 805 may identify journal entries with sequence numbers greater than SN1 as the set of entries to be examined for identifying potential read-write conflicts for the requested transaction. If any of the write sets of the identified committed transaction entries overlaps with the read set of the requested transaction, the transaction may be rejected/aborted; otherwise, the transaction may be approved for commit in this example scenario.

The optimistic concurrency control mechanism illustrated in FIG. 8 may allow more complex types of atomic operations to be supported, e.g., at the request of an MDOS, than may have been possible using the underlying data stores' concurrency control mechanisms in at least some scenarios. For example, some high-performance non-relational data stores may only allow single-item transactions (i.e., writes may be permitted one at a time, but if multiple writes are submitted in a single batch update, atomicity/consistency guarantees may not be provided for the multiple writes taken together). With the journal-based approach described above, a single transaction that encompasses writes to multiple locations of the non-relational data store (and/or other data stores as well) may be supported with relative ease.

Example Graphical Interfaces

Figure 9:
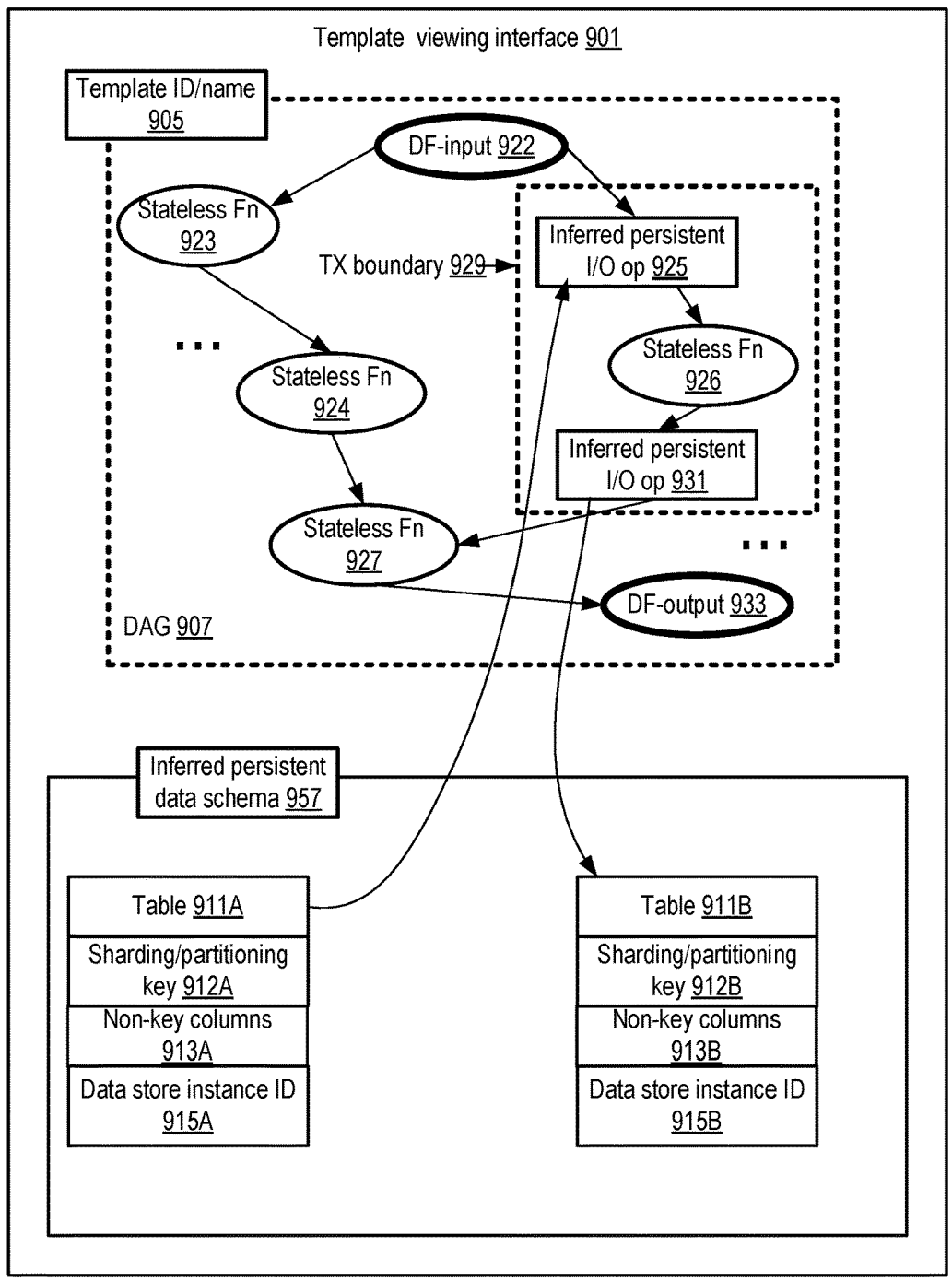
FIG. 9 illustrates an example programmatic interface that may be used to view dataflow templates and associated inferred data schemas, according to at least some embodiments.

FIG. 9 illustrates an example programmatic interface that may be used to view dataflow templates and associated inferred data schemas, according to at least some embodiments. As mentioned earlier, in various embodiments a multi-service dataflow orchestration service may implement a number of programmatic interfaces for its clients, including graphical user interfaces. Template viewing interface 901 of FIG. 9 represents one example of such a graphical user interface. Via the interface, in at least some embodiments, a representation of a template DAG 907 generated at an MDOS (similar in features and functionality to MDOS 105 of FIG. 1) in response to an orchestration request may be presented. The name and/or identifier of the template 905 may be included in the display, as well as the nodes (e.g., nodes 922, 923, 924, 925, 926, 927, 931 and 933) and edges of the DAG in various embodiments. A client of the MDOS may be able to view not just the sequence in which functions indicated in the orchestration request are going to be executed (e.g., a sequence deduced by the MDOS based on analysis of the input and output data types of the functions), but also information about the I/O operations inferred by the MDOS, transaction boundaries, and the like via an interface 901 in some embodiments. As such, clients may be able to obtain, via an easy-to-use interface, a more complete understanding of the analysis performed on the orchestration request by the MDOS, and the conclusions reached at the MDOS regarding persistent data store interactions, than may have been possible using non-graphical interfaces in various embodiments. Note that text or other non-graphical representations (e.g., comprising pseudo-code) of a template may also be provided to clients if desired in at least some embodiments.

In the depicted embodiment, the MDOS may also provide additional details regarding the inferred persistent data schemas 957 associated with the template whose DAG is presented. In the depicted example scenario, information about two tables that are accessed may be presented graphically: table 911A, from which data may be read in inferred persistent I/O operation 925, as well as table 911B, to which data may be written in inferred persistent I/O operation 931. Graphical indications of the tables accessed from individual nodes of the DAG may be provided in various embodiments. As mentioned earlier, in some embodiments the MDOS may generate tables to be used to store persistent data for dataflow instances, and tables 911A and/or 911B may have been generated by the MDOS. In at least some embodiments, clients of the MDOS may be permitted to load data into one or more tables using interfaces other than those used for orchestration requests or dataflow instance requests— e.g., bulk loading interfaces may be made available for clients to populate one or more tables 911. In the depicted embodiment, information presented about a table 911 may include a sharding/partitioning key 912 (e.g., key 912A or 912B) of the table, one or more non-key columns 913 (e.g., 913A or 913B), and/or an identifier 915 (e.g., 915A or 915B) of the data store instance used for the table. Other details regarding persistent I/O and/or the DAG of the template may be provided in at least some embodiments to MDOS clients via interfaces similar to that shown in FIG. 9.

Figure 10:
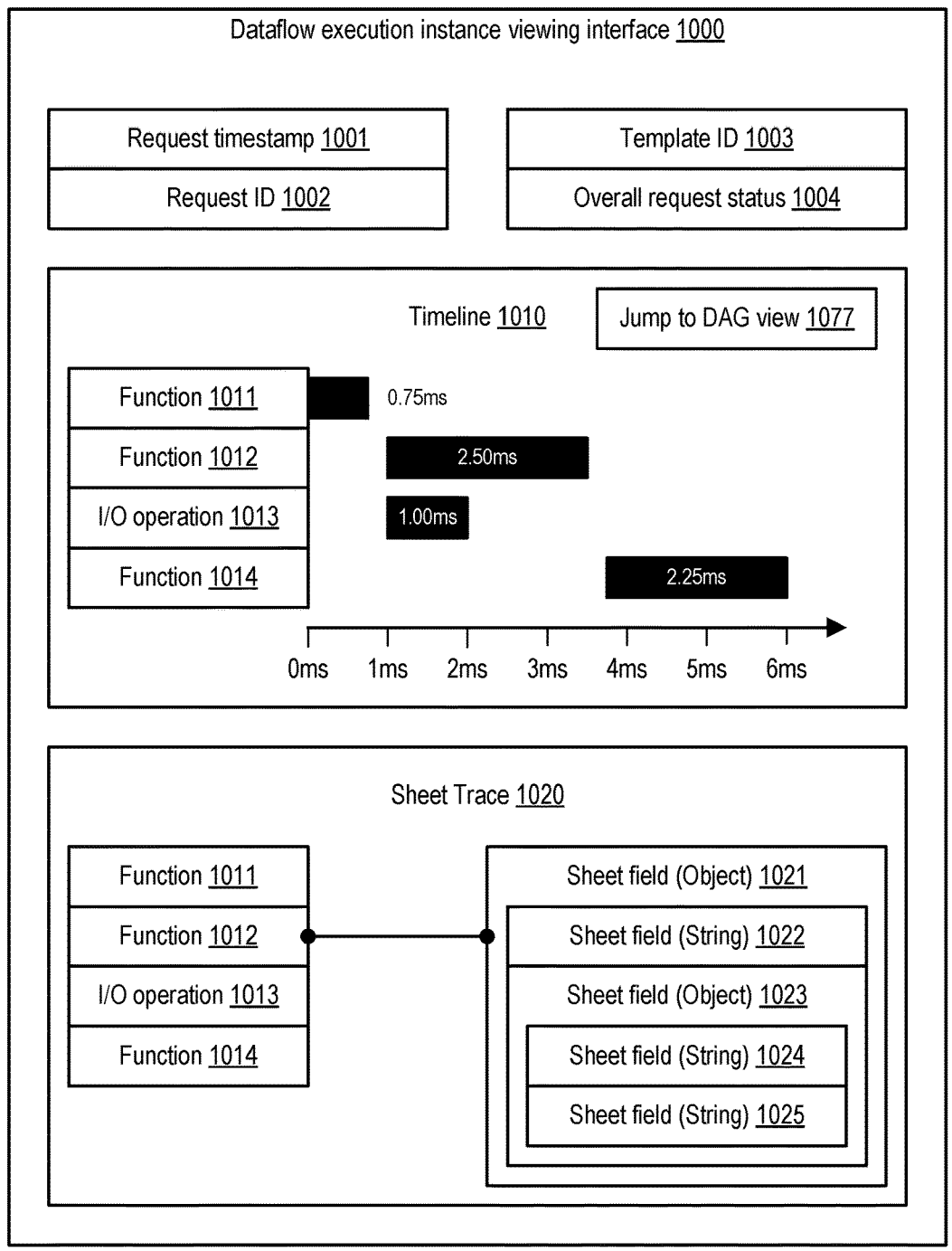
FIG. 10 illustrates an example programmatic interface that may be used to view the progress of execution of a dataflow instance, according to at least some embodiments.

FIG. 10 illustrates an example programmatic interface that may be used to view the progress of execution of a dataflow instance, according to at least some embodiments. In the depicted embodiment, a dataflow execution instance viewing interface 1000 may display an overview of high-level properties of the dataflow instance (comprising elements 1001, 10002, 1003 and 1004), timing information pertaining to the dataflow instance (e.g., timeline region 1010), as well as a sheet trace region 1020.

The high-level properties may include a request timestamp 1001 indicating when the execution request that led to the dataflow instance was received (or when processing of the execution request began), an identifier 1003 of the pre-created template, a request identifier 1002, and an overall request status field (which may for example indicate "in-progress", "failed" or "succeeded") in the depicted embodiment. In the timeline region 1010, the relative timing of the start and end of individual functions of the dataflow may be indicated in at least some embodiments. For example, as shown, the execution of function 1011 begins at a time represented by 0 ms (milliseconds) on the timeline, and ends at 0.75 ms; function 1012 runs from 1 ms to 3.5 ms; an inferred I/O operation 1013 runs from 1 ms to 2 ms, and function 1014 starts from 3.75 ms to 6 ms. In some embodiments, a control element similar to button 1077 may be used to transition to a view of the DAG, with start and end timings of various nodes shown. The sheet trace region 1020 may provide values of inputs and outputs of various functions and I/O operations (such as function 1011, 1012, or 1014, and I/O operation 1013) including hierarchical data structures comprising multiple levels in some embodiments. For example, in the depicted embodiment, an object 1021 representing an input or output of function 1021 may comprise a string sub-object 1022 and a sub-object 1023, with the sub-object 1023 itself comprising two string sub-fields 1024 and 1025. A user may be provided control elements to drill down to any desired level of detail within various complex objects that form the inputs and/or outputs of various functions in the depicted embodiment, or the results of various I/O operations. In at least some embodiments, a persistent representation of the kinds of information presented in FIG. 10 may be stored at a repository, e.g., to facilitate offline debugging and analysis of the execution of dataflow instances. Other types of visual presentations of complex dataflows orchestrated by a multi-service dataflow orchestration service, with layouts differing from those indicated in FIG. 10, may be provided in various embodiments.

Methods for Dataflow Management

FIG. 11 is a flow diagram illustrating aspects of operations that may be performed to generate and store dataflow templates, according to at least some embodiments. An indication of an orchestration request comprising an unordered collection of stateless function descriptors may be received, e.g., at a request handler of a network-accessible multi-service dataflow orchestration service (MDOS) of a provider network in some embodiments. The orchestration request, which may also be referred to as a template creation request or a dataflow specification request in some embodiments, may indicate respective input data types and output data types of functions corresponding to individual ones of the function descriptors. The bodies of at least some of the functions (e.g., source code of the functions, expressed in any appropriate programming language) may also be included in the function descriptors in various embodiments.

In at least some embodiments, at least some of the functions may be expected to be stateless, that is, the results produced by the execution of a given function may be assumed to be dependent only on the inputs provided to that function, and the operations of a given function may be expected to be free of side effects such as the modification of state information used in the computations of the function. In at least one embodiment, e.g., in response to an optional request to verify the statelessness of one or more functions, the MDOS may perform one or more tests to confirm that the functions are in fact stateless. Such verification may be performed, for example, by executing a function in a sandboxed environment which does not permit certain types of I/O or networking operations that may result in side effects, and confirming that the function completes successfully in such constrained environments. In other embodiments, the MDOS may not attempt to verify that at least some of the functions are free of side effects. In some embodiments, the orchestration request may include annotations similar to those discussed earlier in the context of FIG. 3. The annotations may, for example, indicate desired persistence properties of one or more inputs or outputs of one or more functions, whether a particular input or output of a function is to be designated as a partitioning attribute for a persistent storage object, whether one or more functions are to be performed as part of an atomic transaction, and the like.

Based at least in part on an analysis of the input and/or output data types of the functions represented by the descriptors, the MDOS may infer that one or more I/O operations are to be directed to at least one data store as part a dataflow corresponding to the orchestration request in the depicted embodiment (element 1104). Some I/O operations and/or functions may be designated as part of respective atomic transactions in various embodiments. In some embodiments, at least some information about the boundaries of a transaction (i.e., a set of functions to be performed atomically) may be indicated in the orchestration request; in other embodiments, the boundaries of at least some transactions may be inferred by the MDOS, e.g., also based on analysis of the input and output data types, persistence properties of the inputs and outputs of the functions, inferred I/O operations, and so on. In at least one embodiment, the MDOS may also determine/select one or more categories of data store types (e.g., a relational database, a journal-based transaction management system, etc.) to be used for persistent data pertaining to instances of the dataflow and/or specific instances of such data stores to be used. In one embodiment, the MDOS may also deduce or infer the schemas of one or more storage objects (such as database tables) to be used for storing data pertaining to the dataflow instances, and/or initialize/create such data objects. Note that at least in some embodiments, such details regarding persistent data management may be decided by the MDOS with limited or no direct guidance from the client on whose behalf the orchestration request is received/processed. For example, while the client may provide some annotations regarding persistence and/or suitability of one or more types of input or output of the functions of the dataflow for designation as a partitioning attribute, the client may not be required to specify data store types, data store instances, data store connectivity information (such as hosts/ports to be used to establish the equivalent of a network connection to a data store instance), table names, table schemas or the like in various embodiments. Such properties may be determined at the MDOS based on the analysis of the function descriptors, and/or based on internal heuristics or policies of the MDOS in various embodiments.

The MDOS may perform a number of types of verification operations in the depicted embodiment on the orchestration request contents (and inferred I/O operations), e.g., to confirm that a directed acyclic graph (DAG) which indicates the sequencing of the functions and the inferred I/O operations can be unambiguously generated (element 1107). In at least some embodiments, other verification operations may include confirming that a partitioning key (which may be used by data store scalability managers to redistribute contents of storage objects among multiple storage devices as workloads increase) has been identified for one or more storage objects used for I/O operations of the dataflow instances, confirming that one or more of the functions indicated in the orchestration request is stateless or side-effect-free, and so on. In some embodiments, the specific types of verification operations to be performed may be indicated in the orchestration request and/or in other programmatic interactions with the submitter of the orchestration request. In at least some embodiments, if the MDOS is unable to successfully verify one or more desired properties of the orchestration request, the MDOS may request clarifications or modifications of the orchestration request from the submitter, e.g., as discussed in the context of FIG. 4.

If and when all the needed verification operations have succeeded, the MDOS may generate and store (e.g., in a persistent repository) a template corresponding to the orchestration request (element 1110) in various embodiments. The template may comprise a DAG whose nodes correspond to respective functions and I/O operations. If needed, based on inferred I/O operations, the MDOS may initialize or create one or more objects (e.g., tables) at one or more data store instances in at least some embodiments, with the schema of the objects being determined by the MDOS. The particular data store types, data store instances and/or materialization nodes for the persistent data may be selected by the orchestration service in various embodiments, as indicated above. In at least one embodiment, the MDOS may select or identify one or more execution platforms at which instances of the dataflow (or at least some of the functions of the dataflow) are later going to be executed, and cause at least some portions of data stores to be materialized or co-located at the execution platforms. In some embodiments in which a journal-based transaction management system similar to that shown in FIG. 8 is used for persistent data pertaining to the template instances, one or more write appliers may be configured to facilitate such co-location of the data with template instance execution resources. As a result of such co-locations, at least (a) some I/O operations and (b) computations of associated stateless functions that generate or consume the results of the I/O operations may be performed at the same execution platform, reducing network transfer requirements and speeding up dataflow instance execution.

In at least some embodiments, in response to the orchestration request, an indication of a network endpoint that can be used to submit requests for execution of instances of the dataflow represented by the template may be provided (element 1113), e.g. to the submitter of the orchestration request. In one embodiment, an indication of a graphical user interface that may be used to view the template and/or associated metadata may also be provided.

Figure 12:
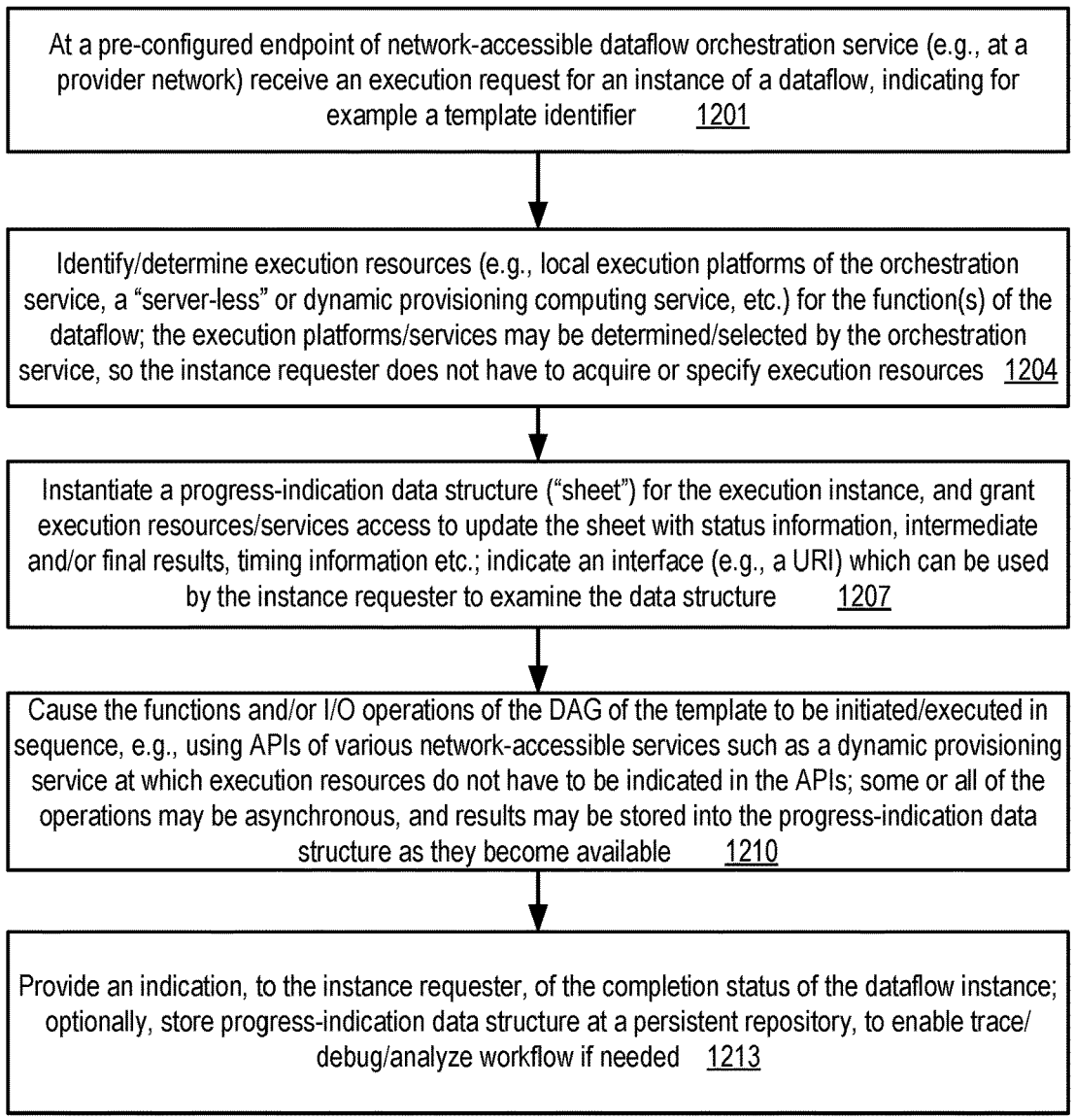
FIG. 12 is a flow diagram illustrating aspects of operations that may be performed to execute instances of dataflows corresponding to generated templates, according to at least some embodiments.

FIG. 12 is a flow diagram illustrating aspects of operations that may be performed to execute instances of dataflows corresponding to generated templates, according to at least some embodiments. As shown in element 1201, an execution request for an instance of a dataflow may be received, e.g., at a pre-configured endpoint of a network-accessible multi-service dataflow orchestration service (MDOS) of a provider network. The request's parameters may include, for example, an identifier of a dataflow template that was created and stored earlier at the MDOS in response to an orchestration request of the kind discussed earlier, or other information that can be used to determine the template identifier.

One or more execution resources (e.g., local execution platforms of the orchestration service, a "server-less" or dynamic provisioning computing service, etc.) may be identified for at least the initial function(s) of the dataflow in the depicted embodiment (element 1204). The execution platforms/services to be used may be determined/selected by the MDOS in some embodiments, so the submitter of the execution request does not have to acquire or specify execution resources or services.

In at least some embodiments, a progress-indication data structure (e.g., a similar to sheet 590 shown in FIG. 5) for the execution instance may be initialized at the MDOS, and the execution resources/services may be granted access to update the sheet with status information, intermediate and/or final results, timing information etc. (element 1207). In at least one embodiment, information about one or more interfaces (e.g., a URI which provided a graphical view) which can be used by the instance requester to examine the progress-indication data structure may be provided.

The MDOS may cause the functions and/or I/O operations of the DAG of the template to be initiated/executed in sequence, e.g., using APIs of various network-accessible services in the depicted embodiment (element 1210). Some functions and/or I/O operations may be executed at the MDOS itself in one embodiment, while other functions or I/O operations may utilize resources of other services of a provider network. In a scenario in which a dynamic provisioning computing service is used to execute a function, for example, the execution platforms to be used may not have to be indicated in the request to run the function; instead, the execution platforms may be selected transparently at the service. In some cases, proposed transactions may be submitted to a transaction manager associated with one or more data stores. For example, in an embodiment in which a journal-based transaction manager similar to that shown in FIG. 8 is employed, a read set of a transaction of the dataflow instance may be determined, and a write set of the transaction may be prepared based at least in part on the read set. A proposed transaction comprising the write set and indicating the read set may be submitted to a journal manager in such embodiments, and the journal manager may utilize an optimistic concurrency control algorithm to determine whether to commit the proposed transaction. Some or all of the functions and/or I/O operations of the dataflow instance may be asynchronous with respect to one another, and results may be stored into the progress-indication data structure as they become available. In at least some embodiments, the progress-indication data structure may include, for example, (a) a value of an input of a function of the dataflow instance, (b) a value of an output of the function, (c) an indication of a time taken to perform the function, (d) a value read in an I/O operation of the dataflow, (e) a value written in an I/O operation, or (f) an indication of a time taken to perform an I/O operation, and so on.

An indication may be provided, to the instance execution requester, of the completion status of the dataflow instance in various embodiments (element 1213). Optionally, a representation of the progress-indication data structure may be stored at a persistent repository, to enable clients to trace/debug/analyze the dataflow if needed.

It is noted that in various embodiments, at least some operations other than those illustrated in the flow diagrams of FIG. 11 and FIG. 12 may be used to implement the dataflow orchestration techniques described above. Some of the operations shown may not be implemented in some embodiments or may be implemented in a different order, or in parallel rather than sequentially.

Example Template for Allocating and Configuring Virtualization Resources

Figure 13:
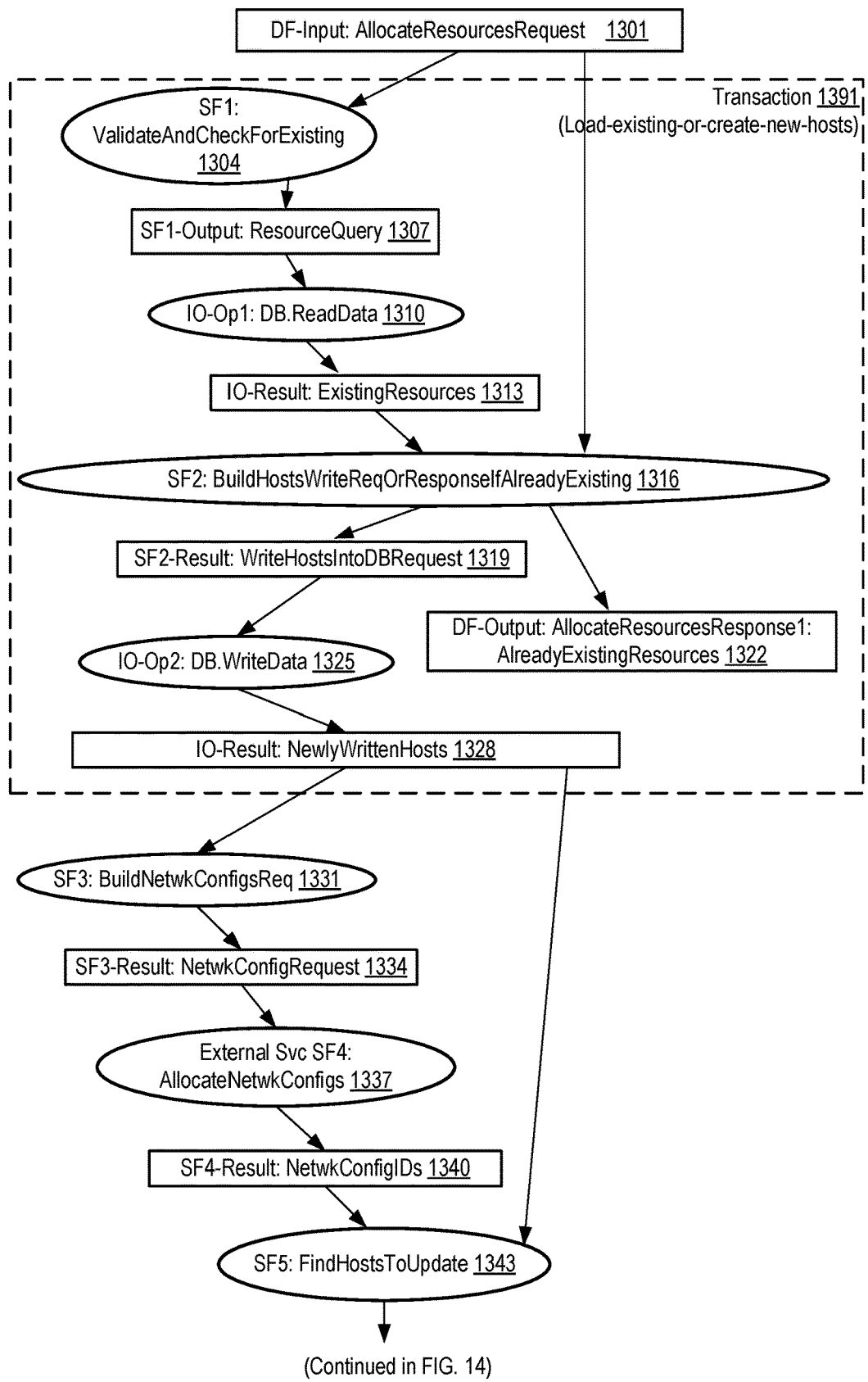
FIG. 13 and FIG. 14 collectively illustrate an example dataflow template that may be generated to facilitate configuration of virtualization resources in response to allocation requests, according to at least some embodiments.
Figure 14:
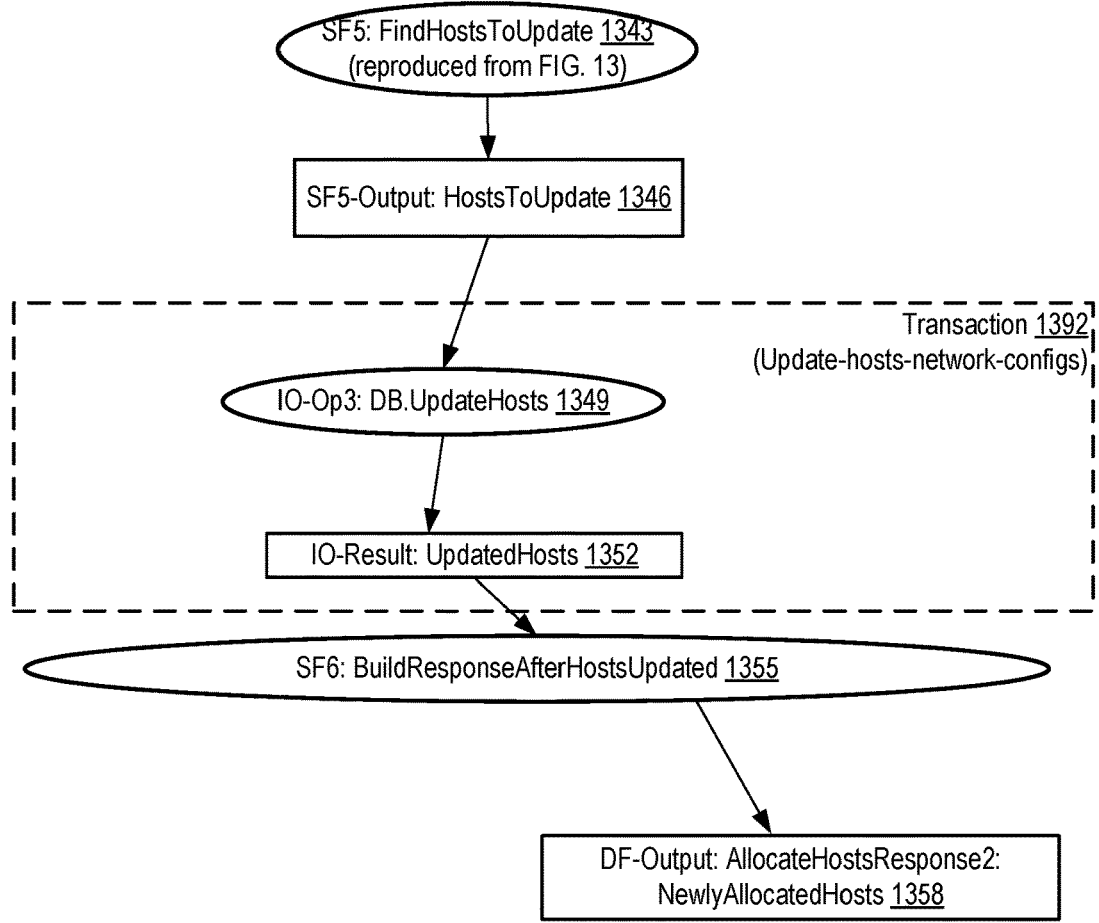

In some embodiments, a multi-service dataflow orchestration service (MDOS) similar to MDOS 105 of FIG. 1 may be utilized at another network-accessible service, e.g., to orchestrate virtualization resource configuration processes or procedures. FIG. 13 and FIG. 14 collectively illustrate an example dataflow template that may be generated to facilitate configuration of virtualization resources in response to allocation requests, according to at least some embodiments. At a high level, the operations of the nodes of the dataflow template illustrated in FIG. 13 and FIG. 14 may collectively represent the following business logic. In response to a request for a set of virtualization resources, such as one or more virtualization hosts with network configurations set up that are suitable for instantiating a set of requested compute instances or virtual machines, a determination may be made as to whether a response to another request for the same set of resources has already been initiated or completed. Such a repeat request scenario may occur, for example, because the requester had already submitted a request for the same task earlier and had not yet received a response due to network congestion or the like. If such an "already existing" response has not been generated, a graph of stateless functions (including an invocation of APIs of a network management service) and inferred database read/write operations, comprising two different atomic transactions, may be traversed to perform configuration operations to fulfill the request in the example scenario.

In the template depicted in FIG. 13 and FIG. 14, the dataflow input may comprise an AllocateResourcesRequest object 1301, and one of two types of dataflow outputs may be generated as the eventual result of the dataflow. The first type of dataflow output, AllocateResourcesResponse1 1322, may be generated if the requested resources have already been set up in response to an earlier-received logically identical version of the same AllocateResourcesRequest; as such, the response may be labeled AlreadyExistingResources.

An orchestration request submitted to the MDOS may indicate the input and output data types or signatures of stateless functions SF1, SF2, SF3, SF4, SF5, and SF6 in the depicted embodiment. In a first transaction 1391, which is labeled Load-existing-or-create-new-hosts in FIG. 13, a pair of inferred database interactions IO-Op1 1310 and IO-Op2 1325 may be combined with stateless functions SF1 1304 and SF2 1316 in the depicted embodiment. A second transaction 1392, labeled Update-hosts-network-configs, may comprise a database interaction IO-OP3. To avoid clutter, various details of the input and output data types of the functions and I/O operations are not presented in FIG. 13 and FIG. 14; instead, only a few key outputs/results are shown, which in several cases are also inputs to other nodes of the DAG. Note that individual ones of the I/O operations in dataflow templates of the kind shown in FIG. 13 and FIG. 14 may involve updates to multiple rows of one or more tables in some cases. If a proposed transaction including such multiple updates is prepared by an MDOS and submitted (e.g., to a journal manager of the type discussed in the context of FIG. 8, or at some other type of transaction manager), all the updates may either be committed as a unit (as expected according to the business logic), or rejected as a unit in various embodiments.

In stateless function SF1 of the Load-existing-or-create-new-hosts transaction, the request 1301 may be validated, and a query (ResourceQuery 1307) may be generated as output. ResourceQuery 1307 may be submitted to a database as a read I/O operation (DB.ReadData 1310), with result ExistingResources 1313 being obtained and used as input (together with the AllocateResourcesRequest 1301) for stateless function SF2. ExistingResources 1313 may of course be null in scenarios when there is no duplication of the same AllocateResourcesRequest. In SF2, as indicated by the function name BuildHostsWriteReqOrPublicResponseIfAlreadyExisting, based purely on the inputs received, either (a) an AlreadyExistingResources response may be generated and provided as an output of the dataflow as a whole, or (b) a request WriteHostslntoDBRequest 1319 may be produced as output. The WriteHostslntoDBRequest leads to IO-Op2, in which information about hosts to be used to respond to the AllocateResourcesRequest 1301 may be written to a database, with the result NewlyWrittenHosts 1328.

A stateless function SF3 1331 (BuildNetwkConfigsRequest), which is not part of the transaction 1391, may consume the information about the newly written hosts and generate a network configuration request 1334 as output, in the depicted example scenario. An API of an external network management service (i.e., a service other than the MDOS) may be invoked to perform stateless function SF4 (AllocateNetwkConfigs). A result (NetwkConfigIDs 1340) obtained from the external network management service may be fed as input to another stateless function SF5 (FindHostsToUpdate 1343) which may determine the specific set of hosts whose records are to be updated with the newly generated networking configuration information. Information about this set of hosts 1346 (shown in FIG. 14) may be written to the database in IO-Op3 DB.UpdateHosts 1349 of transaction 1392 in the depicted example scenario. The results 1352 of the transaction, indicating the records updated at the database, may be used as input to the final stateless function SF6 (BuildResponseAfterHostsUpdates) which produces the overall response message of the dataflow (DF-Output) 1358, indicating the newly allocated hosts.

Use Cases

The techniques described above, of inferring data store interactions for non-trivial applications specified as collections of stateless functions, and performing the functions and I/O operations using a combination of services and/or resources, may be useful in a variety of scenarios. The complexity of applications being run using a collection of provider network resources is increasing rapidly, leading to commensurate increases in the difficulty of understanding, testing and debugging such applications. By requesting application designers/developers to focus on the business logic of their dataflows, and reducing the requirements for considering data store related details, the probability that complex applications can be thoroughly tested and debugged may be increased substantially. As a result, fewer errors may be encountered in production, resulting in greater customer satisfaction and reduction in error recovery-related processing.

Illustrative Computer System

Figure 15:
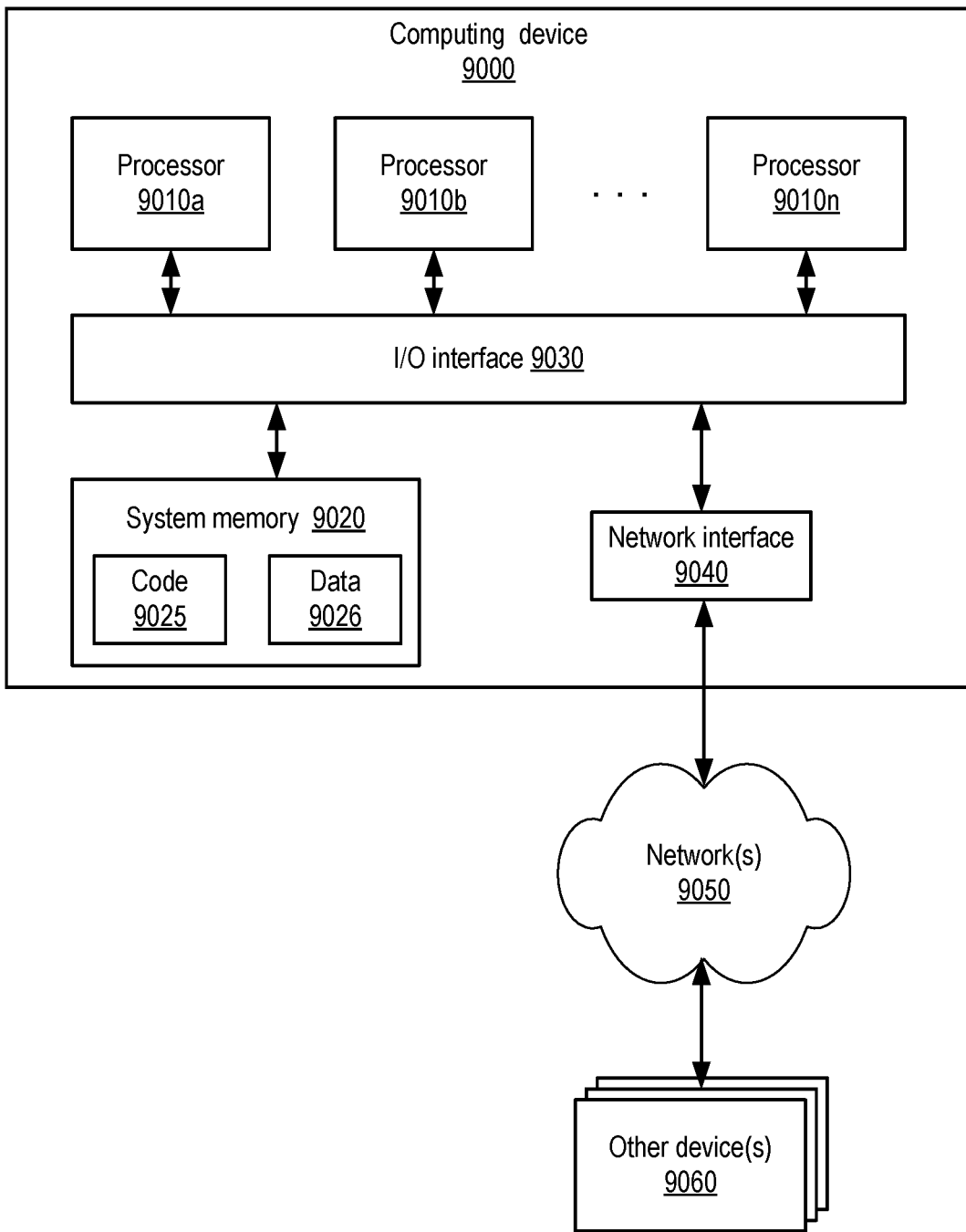
FIG. 15 is a block diagram illustrating an example computing device that may be used in at least some embodiments.

In at least some embodiments, a server that implements a portion or all of one or more of the technologies described herein, including the various components of a dataflow orchestration service and/or the client devices that interact with such services, may include a general-purpose computer system that includes or is configured to access one or more computer-accessible media. FIG. 15 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030. In at least some embodiments computing device 9000 may include a motherboard to which some or all of such components may be attached.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 14, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 14 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 15 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   one or more computing devices of a network-accessible service;
   wherein the one or more computing devices include instructions that upon execution on or across one or more processors cause the one or more computing devices to:
   obtain an orchestration request comprising a plurality of stateless function descriptors, including a first stateless function descriptor, wherein the first stateless function descriptor includes (a) a first set of one or more input data types of a first stateless function and (b) a first set of one or more output data types of the first stateless function, wherein the orchestration request does not indicate a sequence in which respective stateless functions corresponding to the plurality of stateless function descriptors are to be executed;
   infer, based at least in part on an analysis of the first set of one or more input data types and the first set of one or more output data types, that one or more input/output (I/O) operations directed to at least a first data store are to be performed as part of a transaction of a dataflow corresponding to the orchestration request, wherein the one or more I/O operations include a first I/O operation, and wherein the orchestration request does not include an indication of the first data store;
   generate, corresponding to the dataflow, a dataflow template comprising a directed graph, wherein the directed graph comprises at least: a first node representing the first stateless function, a second node representing the first I/O operation, one or more edges indicating sequencing of execution of the first stateless function relative to the first I/O operation, and an indication of transaction boundaries of a transaction, wherein the first I/O operation is part of the transaction;
   store the dataflow template in a repository; and
   in response to an execution request for an instance of the dataflow,
   determine that a dynamic provisioning computing service is to be employed to execute at least the first stateless function, wherein the dynamic provisioning computing service is not indicated in the orchestration request or the execution request;
   issue, to the dynamic provisioning computing service, without indicating an execution platform to be used, a request to execute the first stateless function;

initiate at least the first I/O operation to store data at one or more data stores including the first data store; and provide an indication of a completion status of the instance of the dataflow.

2. The system as recited in claim 1, wherein the one or more computing devices include further instructions that upon execution on or across one or more processors further cause the one or more computing devices to:

cause at least a portion of a second data store to be co-located at an execution platform at which a second stateless function of the instance of the dataflow is executed, wherein the directed graph comprises a node representing a second I/O operation directed to the second data store.

3. The system as recited in claim 1, wherein the one or more computing devices include further instructions that upon execution on or across one or more processors further cause the one or more computing devices to:

cause, in response to the orchestration request, a table to be created at the first data store, wherein the orchestration request does not indicate a schema of the table.

4. The system as recited in claim 1, wherein the one or more computing devices include further instructions that upon execution on or across one or more processors further cause the one or more computing devices to:

cause, in response to the orchestration request, a network endpoint to be configured to receive respective execution requests for one or more instances of the dataflow.

5. A method, comprising:

performing, at one or more computing devices:

obtaining an indication of an orchestration request comprising a plurality of function descriptors, including a first function descriptor, wherein the first function descriptor includes (a) one or more input data types of a first function and (b) one or more output data types of the first function;

determining, based at least in part on an analysis of the one or more input data types and the one or more output data types, that one or more input/output (I/O) operations directed to at least a first data store are to be performed to execute a dataflow, wherein the one or more I/O operations include a first I/O operation;

generating, corresponding to the dataflow, a dataflow template, wherein the dataflow template comprises at least: a first node representing the first function, a second node representing the first I/O operation, and an indication of sequencing of the execution of the first function relative to the first I/O operation; and in response to an execution request for an instance of the dataflow, causing, using one or more resources that are not specified in the execution request, (a) one or more functions represented by respective nodes of the dataflow template to be executed, and (b) one or more I/O operations represented by respective nodes of the dataflow template to be initiated.

6. The system as recited in claim 5, wherein the orchestration request does not indicate a transaction boundary of the transaction, wherein the one or more computing devices include further instructions that upon execution on or across one or more processors further cause the one or more computing devices to:

infer a transaction boundary of the transaction.

7. The method as recited in claim 5, further comprising performing, at the one or more computing devices:

inferring, based at least in part on the analysis of the one or more input data types and the one or more output data types, that a transaction request is to be submitted as part of the dataflow; and storing an indication of one or more functions or I/O operations of the dataflow to be included in the transaction request.

8. The method as recited in claim 5, wherein the orchestration request indicates a persistence property of one or more of (a) an input value corresponding to an input data type of the one or more input data types or (b) an output value corresponding to an output data type of the one or more output data types.

9. The method as recited in claim 5, further comprising performing, at the one or more computing devices:

in response to the indication of the first execution request, submitting a proposed transaction to a transaction manager associated with one or more data stores including the first data store.

10. The method as recited in claim 5, wherein the orchestration request indicates that one or more functions are to be included within a transaction.

11. The method as recited in claim 5, further comprising performing, by the one or more computing devices:

selecting, based at least in part on an analysis of the one or more input data types and the one or more output data types, the first data store from among a plurality of data stores, wherein the plurality of data stores includes (a) a relational database, (b) a key-value data store (c) an object-oriented database (d) a journal-based transaction management system.

12. The method as recited in claim 5, further comprising:

determining, by the one or more computing devices, a partitioning attribute of a first storage object accessed during execution of the instance of the dataflow; and automatically redistributing, by a data store scalability manager based at least in part on the partitioning attribute, contents of the first storage object among a plurality of storage devices, without receiving a redistribution request.

13. The method as recited in claim 5, further comprising performing, at the one or more computing devices:

inferring, based at least in part on an analysis of the first set of input data types or the first set of output data types, a sequence in which a plurality of functions represented by individual ones of the plurality of function descriptors is to be executed.

14. The method as recited in claim 5, the method further comprising performing, at the one or more computing devices:

initializing a progress indicator data structure corresponding to the instance of the dataflow;

storing, in the progress indicator data structure, one or more of: (a) a value of an input of the first function, (b) a value of an output of the first function, (c) an indication of a time taken to perform the first function, (d) a value read in the first I/O operation, (e) a value written in the first I/O operation, or (f) an indication of a time taken to perform the first I/O operation; and causing a representation of the progress indicator data structure to be provided via a programmatic interface.

15. The method as recited in claim 5, further comprising:

determining, at the one or more computing devices, a read set of a first transaction of the instance of the dataflow;

preparing, at the one or more computing devices, a write set of the first transaction, wherein the read set is based at least in part on the read set;

submitting, from the one or more computing devices, a proposed transaction, comprising at least the write set, to a journal manager; and utilizing, by the journal manager, an optimistic concurrency control algorithm to determine that the proposed transaction is to be committed.

16. One or more non-transitory computer-accessible storage media storing program instructions that when executed on or across one or more processors cause one or more computer systems to:

obtain an indication of an orchestration request comprising a plurality of function descriptors, including a first function descriptor, wherein the first function descriptor includes (a) one or more input data types of a first function and (b) one or more output data types of the first function;

infer, based at least in part on an analysis of the one or more input data types and the one or more output data types, that one or more input/output (I/O) operations directed to at least a first data store are to be performed to execute a dataflow, wherein the one or more I/O operations include a first I/O operation; and store a dataflow template corresponding to the dataflow, wherein the dataflow template comprises at least a first node representing the first function, at least a second node representing the first I/O operation, and an indication of sequencing of the execution of the first function relative to the first I/O operation.

17. The one or more non-transitory computer-accessible storage media as recited in claim 16, storing further program instructions that when executed on or across the one or more processors further cause one or more computer systems to:

determine a schema of a storage object of the first data store, wherein data generated in the one or more I/O operations is stored in the storage object, wherein the schema is not indicated in the orchestration request; and cause the storage object to be created in the first data store in response to the indication of the orchestration request.

18. The one or more non-transitory computer-accessible storage media as recited in claim 16, wherein the dataflow template comprises an indication of (a) a start of an atomic transaction and (b) an end of the atomic transaction, wherein the atomic transaction comprises at least one I/O operation of the one or more I/O operations.

19. The one or more non-transitory computer-accessible storage media as recited in claim 16, storing further program instructions that when executed on or across the one or more processors further cause one or more computer systems to:

perform, prior to storing the dataflow template, a test to verify that the first function is a stateless function.

20. The one or more non-transitory computer-accessible storage media method as recited in claim 16, wherein the orchestration request indicates a persistence property of one or more of (a) values of an input data type of the one or more input data types or (b) values of an output data type of the one or more output data types.

* * * * *